United States Patent
Saito et al.

(10) Patent No.: US 10,280,368 B2
(45) Date of Patent: *May 7, 2019

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Masayuki Saito, Chiba (JP); Yoshimasa Furusato, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 145 days.

This patent is subject to a terminal disclaimer.

(21) Appl. No.: 14/903,283

(22) PCT Filed: Mar. 25, 2014

(86) PCT No.: PCT/JP2014/058266
§ 371 (c)(1),
(2) Date: Jan. 7, 2016

(87) PCT Pub. No.: WO2015/004954
PCT Pub. Date: Jan. 15, 2015

(65) Prior Publication Data
US 2016/0376506 A1    Dec. 29, 2016

(30) Foreign Application Priority Data

Jul. 11, 2013  (JP) ................. 2013-145404

(51) Int. Cl.
| | | |
|---|---|---|
| C09K 19/54 | (2006.01) | |
| C09K 19/30 | (2006.01) | |
| G02F 1/00 | (2006.01) | |
| C09K 19/34 | (2006.01) | |
| C09K 19/04 | (2006.01) | |
| C09K 19/12 | (2006.01) | |
| C09K 19/16 | (2006.01) | |

(52) U.S. Cl.
CPC ........ *C09K 19/542* (2013.01); *C09K 19/3066* (2013.01); *C09K 19/3068* (2013.01); *C09K 19/3402* (2013.01); *G02F 1/0045* (2013.01); *C09K 2019/0448* (2013.01); *C09K 2019/122* (2013.01); *C09K 2019/123* (2013.01); *C09K 2019/163* (2013.01); *C09K 2019/301* (2013.01); *C09K 2019/3027* (2013.01); *C09K 2019/3037* (2013.01); *C09K 2019/3422* (2013.01); *C09K 2019/3425* (2013.01); *C09K 2019/548* (2013.01)

(58) Field of Classification Search
CPC ................................. C09K 19/3402
See application file for complete search history.

(56) References Cited

U.S. PATENT DOCUMENTS

| | | | |
|---|---|---|---|
| 7,927,671 B2* | 4/2011 | Kato | C08F 26/06 252/299.5 |
| 2004/0011996 A1 | 1/2004 | Klasen-Memmer et al. | |
| 2005/0116200 A1 | 6/2005 | Nakanishi et al. | |
| 2012/0224124 A1* | 9/2012 | Goetz et al. | |
| 2013/0135575 A1 | 5/2013 | Gotoh et al. | |
| 2013/0277609 A1 | 10/2013 | Goto et al. | |
| 2014/0008570 A1 | 1/2014 | Taugerbeck et al. | |
| 2014/0043579 A1 | 2/2014 | Furusato et al. | |
| 2014/0085590 A1 | 3/2014 | Feng et al. | |
| 2014/0198291 A1 | 7/2014 | Saito et al. | |
| 2014/0293213 A1 | 10/2014 | Kurisawa et al. | |
| 2015/0299570 A1 | 10/2015 | Kurisawa et al. | |

FOREIGN PATENT DOCUMENTS

| | | |
|---|---|---|
| CN | 101627063 | 1/2010 |
| EP | 1889894 | 10/2009 |
| EP | 2682448 | 1/2014 |
| JP | 2003-307720 | 10/2003 |
| JP | 2004-131704 | 4/2004 |
| JP | 6061050 | 1/2017 |
| WO | 2013161576 | 10/2013 |

(Continued)

OTHER PUBLICATIONS

"International Search Report (Form PCT/ISA/210)", dated Jun. 17, 2014, pp. 1-5, with English translation thereof.

(Continued)

*Primary Examiner* — Chanceity N Robinson
(74) *Attorney, Agent, or Firm* — JCIPRNET

(57) ABSTRACT

A liquid crystal composition satisfying at least one characteristic such as high maximum temperature, low minimum temperature, small viscosity, suitable optical anisotropy, large negative dielectric anisotropy, large specific resistance, high stability to UV light or to heat, or having a suitable balance regarding at least two of the characteristics, and an AM device having characteristics such as a short response time, a large voltage holding ratio, a low threshold voltage, a large contrast ratio and a long service life are shown. The liquid crystal composition contains a specific compound having at least three polymerizable groups, and the liquid crystal display device includes the composition. The composition may contain a specific compound having large negative dielectric anisotropy as a first component, and a specific compound having a high maximum temperature or small viscosity as a second component.

17 Claims, No Drawings

(56) References Cited

FOREIGN PATENT DOCUMENTS

| | | |
|---|---|---|
| WO | 2013161669 | 10/2013 |
| WO | 2014024648 | 2/2014 |
| WO | 2014043962 | 3/2014 |
| WO | 2013022088 | 3/2015 |
| WO | 2013080850 | 4/2015 |
| WO | 2013088980 | 4/2015 |

OTHER PUBLICATIONS

"Office Action of China Counterpart Application," dated Oct. 10, 2016, with English translation thereof, p. 1-p. 11.

* cited by examiner

LIQUID CRYSTAL COMPOSITION AND LIQUID CRYSTAL DISPLAY DEVICE

CROSS-REFERENCE TO RELATED APPLICATION

This application is a 371 application of International PCT application serial no. PCT/JP2014/058266, filed on Mar. 25, 2014, which claims the priority benefit of Japan application serial no. 2013-145404, filed on Jul. 11, 2013. The entirety of each of the above-mentioned patent applications is hereby incorporated by reference herein and made a part of this specification.

TECHNICAL FIELD

The invention relates to a liquid crystal composition, a liquid crystal display device including the composition, and so forth. In particular, the invention relates to a liquid crystal composition having a negative dielectric anisotropy, and a liquid crystal display device that includes the composition and has a mode such as an IPS mode, a VA mode, an FFS mode and an FPA mode. The invention also relates to a liquid crystal display device having a polymer sustained alignment mode.

BACKGROUND ART

In a liquid crystal display device, a classification based on an operating mode for liquid crystal molecules includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode and a field-induced photo-reactive alignment (FPA) mode. A classification based on a driving mode in the device includes a passive matrix (PM) and an active matrix (AM). The PM is classified into static and multiplex and so forth. The AM is classified into a thin film transistor (TFT), a metal insulator metal (MIM) and so forth. TFT is classified into amorphous silicon and polycrystal silicon based on a material. The latter is further classified into a high temperature type and a low temperature type based on a production process. A classification based on a light source includes a reflective type utilizing natural light, a transmissive type utilizing backlight and a transflective type utilizing both the natural light and the backlight.

The liquid crystal display device includes a liquid crystal composition having a nematic phase. The composition has suitable characteristics. An AM device having good characteristics can be obtained by improving characteristics of the composition. Table 1 below summarizes a relationship of the characteristics between two aspects. The characteristics of the composition will be further described based on a commercially available AM device. A temperature range of the nematic phase relates to a temperature range in which the device can be used. A preferred maximum temperature of the nematic phase is about 70° C. or higher, and a preferred minimum temperature of the nematic phase is about −10° C. or lower. Viscosity of the liquid crystal composition relates to a response time of the device. A short response time is preferred for displaying moving images on the device. A shorter response time even by one millisecond is desirable. Accordingly, a small viscosity of the composition is preferred. A small viscosity at a low temperature is further preferred.

TABLE 1

Characteristics of Composition and AM Device

| No. | Characteristics of Composition | Characteristics of AM Device |
|---|---|---|
| 1 | Wide temperature range of a nematic phase | Wide usable temperature range |
| 2 | Small viscosity[1] | Short response time |
| 3 | Suitable optical anisotropy | Large contrast ratio |
| 4 | Large positive or negative dielectric anisotropy | Low threshold voltage and small electric power consumption Large contrast ratio |
| 5 | Large specific resistance | Large voltage holding ratio and large contrast ratio |
| 6 | High stability to UV light and heat | Long service life |

[1] A liquid crystal composition can be injected into an LCD device in a short time.

An optical anisotropy of the composition relates to a contrast ratio in the device. According to a mode of the device, a large optical anisotropy or a small optical anisotropy, more specifically, a suitable optical anisotropy is required. A product ($\Delta n \times d$) of the optical anisotropy ($\Delta n$) of the composition and a cell gap (d) in the device is designed so as to maximize the contrast ratio. A suitable value of the product depends on a type of the operating mode. The suitable value is in the range of about 0.30 μm to about 0.40 μm in a device having the VA mode, and is in the range of about 0.20 μm to about 0.30 μm in a device having the IPS mode or the FFS mode. In the above cases, a composition having the large optical anisotropy is preferred for a device having a small cell gap. A large dielectric anisotropy in the composition contributes to a low threshold voltage, a small electric power consumption and a large contrast ratio in the device. Accordingly, the large dielectric anisotropy is preferred. A large specific resistance in the composition contributes to a large voltage holding ratio and the large contrast ratio in the device. Accordingly, a composition having the large specific resistance at room temperature and also at a high temperature in an initial stage is preferred. The composition having the large specific resistance at room temperature and also at a high temperature after the device has been used for a long period of time is preferred. Stability of the composition to UV light and heat relates to a service life of the liquid crystal display device. In the case where the stability is high, the device has a long service life. Such characteristics are preferred for an AM device used in a liquid crystal projector, a liquid crystal television and so forth.

In a liquid crystal display device having a polymer sustained alignment (PSA) mode, a liquid crystal composition containing a polymer is used. First, a composition to which a small amount of a polymerizable compound is added is injected into the device. Then, the composition is irradiated with UV light while voltage is applied between substrates of the device. The polymerizable compound is polymerized to form a network structure of the polymer in the liquid crystal composition. In the composition, alignment of liquid crystal molecules can be controlled by the polymer, and therefore the response time of the device is shortened and also image persistence is improved. Such an effect of the polymer can be expected for a device having the mode such as the TN mode, the ECB mode, the OCB mode, the IPS mode, the VA mode, the FFS mode and the FPA mode.

A composition having a positive dielectric anisotropy is used for an AM device having the TN mode. In an AM device having the VA mode, a composition having a negative dielectric anisotropy is used. A composition having the positive or negative dielectric anisotropy is used for an AM device having the IPS mode, the FFS mode or the FPA mode. Examples of the liquid crystal compositions using in a polymer sustained alignment mode device are disclosed in Patent literature No. 1 to No. 3 described below.

CITATION LIST

Patent Literature

Patent literature No. 1: JP 2003-307720 A.
Patent literature No. 2: JP 2004-131704 A.
Patent literature No. 3: EP 1889894 A.

SUMMARY OF THE INVENTION

Technical Problem

One of the aims of the invention is to provide a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to UV light and a high stability to heat. Another aim is to provide a liquid crystal composition having a suitable balance regarding at least two of the characteristics. Another aim is to provide a liquid crystal display device including such a composition. Another aim is to provide an AM device having characteristics such as a short response time, a large voltage holding ratio, a low threshold voltage, a large contrast ratio and a long service life.

Solution to Problem

The invention concerns a liquid crystal composition that has a negative dielectric anisotropy and contains at least one polymerizable compound selected from the group of compounds represented by formula (1), and a liquid crystal display device including the composition:

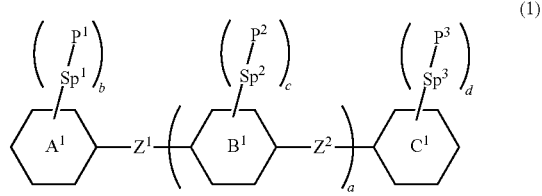

(1)

wherein, in formula (1), ring $A^1$ and ring $C^1$ are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen; ring $B^1$ is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen; $Z^1$ and $Z^2$ are independently a single bond or alkylene having 1 to 10 carbons, and in the alkylene, at least one —$CH_2$— may be replaced by —O—, —CO—, —COO— or —OCO—, at least one —$CH_2$—$CH_2$— may be replaced by —CH=CH—, —C($CH_3$)=CH—, —CH=C($CH_3$)— or —C($CH_3$)=C($CH_3$)—, and in the groups, at least one hydrogen may be replaced by fluorine or chlorine; $P^1$, $P^2$ and $P^3$ are independently acryloyloxy or methacryloyloxy; $Sp^1$, $Sp^2$ and $Sp^3$ are independently a single bond or alkylene having 1 to 10 carbons, and in the alkylene, at least one —$CH_2$— may be replaced by —O—, —COO—, —OCO— or —OCOO—, at least one —$CH_2$—$CH_2$— may be replaced by —CH=CH— or —C≡C—, and in the groups, at least one hydrogen may be replaced by fluorine or chlorine; a is 1 or 2; and b, c and d are independently an integer from 1 to 4, in which, when a is 2, one of c may be 0.

Advantageous Effects of Invention

An advantage of the invention is a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to UV light and a high stability to heat. Another advantage is a liquid crystal composition having a suitable balance regarding at least two of the characteristics. Another advantage is a liquid crystal display device including such a composition. Another advantage is an AM device having characteristics such as a short response time, a large voltage holding ratio, a low threshold voltage, a large contrast ratio and a long service life.

DESCRIPTION OF EMBODIMENTS

Usage of terms herein is as described below. Terms "liquid crystal composition" and "liquid crystal display device" may be occasionally abbreviated as "composition" and "device," respectively. The liquid crystal display device is a generic term for a liquid crystal display panel and a liquid crystal display module. A liquid crystal compound is a generic term for a compound having a liquid crystal phase such as a nematic phase and a smectic phase, and a compound having no liquid crystal phase but to be mixed with a composition for the purpose of adjusting characteristics such as a temperature range of the nematic phase, viscosity and a dielectric anisotropy. The compound has a six-membered ring such as 1,4-cyclohexylene and 1,4-phenylene, and has rod like molecular structure. A polymerizable compound is added for the purpose of forming a polymer in the composition.

The liquid crystal composition is prepared by mixing a plurality of liquid crystal compounds. A proportion (content) of a liquid crystal compound is expressed in terms of weight percent (wt %) based on the weight of the liquid crystal composition. An additive such as an optically active compound, an antioxidant, an UV light absorber, a dye, an antifoaming agent, the polymerizable compound, a polymerization initiator and a polymerization inhibitor is added to the liquid crystal composition when necessary. A proportion (content) of the additive is expressed in terms of weight percent (wt %) based on the weight of the liquid crystal composition in a manner similar to the proportion of the liquid crystal compound. Weight parts per million (ppm) may be occasionally used. A proportion of the polymerization initiator and the polymerization inhibitor is exceptionally expressed based on the weight of the polymerizable compound.

An expression "maximum temperature of the nematic phase" may be occasionally abbreviated as "maximum temperature." An expression "minimum temperature of the nematic phase" may be occasionally abbreviated as "minimum temperature." An expression "having a large specific resistance" means that the composition has a large specific resistance at room temperature and also at a temperature close to the maximum temperature of the nematic phase in an initial stage, and the composition has the large specific resistance at room temperature and also at a temperature close to the maximum temperature of the nematic phase even after the device has been used for a long period of time. An expression "having a large voltage holding ratio" means that the device has a large voltage holding ratio at room temperature and also at a temperature close to the maximum temperature of the nematic phase in the initial stage, and the device has the large voltage holding ratio at room temperature and also at a temperature close to the maximum temperature of the nematic phase even after the device has been used for the long period of time. An expression "increase the dielectric anisotropy" means that a value of dielectric anisotropy positively increases in a liquid crystal composition having a positive dielectric anisotropy, and the value of dielectric anisotropy negatively increases in a liquid crystal composition having a negative dielectric anisotropy.

An expression "at least one of 'A' may be replaced by 'B'" means that the number of 'A' is arbitrary. A position of 'A' is arbitrary when the number of 'A' is 1, and when the number of 'A' is 2 or more, positions thereof can also be selected without restriction. A same rule applies also to an expression "at least one of 'A' is replaced by 'B'."

A symbol of a terminal group $R^1$ is used for a plurality of compounds in chemical formulas of component compounds. In the compounds, two groups represented by two of arbitrary $R^1$ may be identical or different. In one case, for example, $R^1$ of compound (2-1) is ethyl and $R^1$ of compound (2-2) is ethyl. In another case, for example, $R^1$ of compound (2-1) is ethyl and $R^1$ of compound (2-2) is propyl. A same rule applies also to a symbol of any other terminal group or the like. In formula (2), when j is 2, two of ring D exists. In the compound, two groups represented by two of ring D may be identical or different. A same rule applies also to two of arbitrary ring D when j is larger than 2. A same rule applies also to a symbol of any other ring, a bonding group or the like.

In compound (1) or the like, a hexagonal shape represents a ring, but the ring is not necessarily a six-membered ring. An oblique line crossing the hexagonal shape represents that arbitrary hydrogen on the ring may be replaced by a group such as $P^1$-$Sp^1$. A subscript such as b represents the number of groups to be replaced, and a case where the number is 0 means no replacement. A same rule applies also to a $P^6$-$Sp^4$ of compound (4) or the like.

Then, 2-fluoro-1,4-phenylene means two divalent groups described below. In a chemical formula, fluorine may be leftward (L) or rightward (R). A same rule applies also to a divalent group of asymmetrical ring such as tetrahydropyran-2,5-diyl:

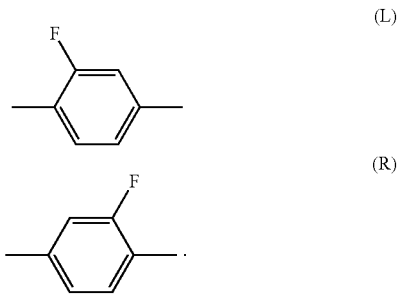

The invention includes the items described below.

Item 1. A liquid crystal composition that has a negative dielectric anisotropy and contains at least one polymerizable compound selected from the group of compounds represented by formula (1):

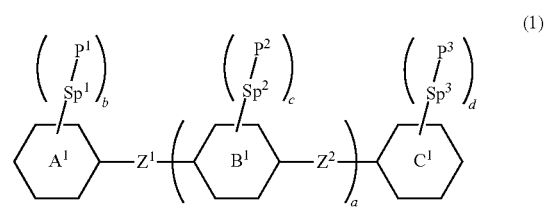

wherein, in formula (1), ring $A^1$ and ring $C^1$ are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen; ring $B^1$ is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen; $Z^1$ and $Z^2$ are independently a single bond or alkylene having 1 to 10 carbons, and in the alkylene, at least one —$CH_2$— may be replaced by —O—, —CO—, —COO— or —OCO—, at least one —$CH_2$—$CH_2$— may be replaced by —CH═CH—, —C($CH_3$)—CH—, —CH═C($CH_3$)— or —C($CH_3$)═C($CH_3$)—, and in the groups, at least one hydrogen may be replaced by fluorine or chlorine; $P^1$, $P^2$ and $P^3$ are independently acryloyloxy or methacryloyloxy; $Sp^1$, $Sp^2$ and $Sp^3$ are independently a single bond or alkylene having 1 to 10 carbons, and in the alkylene, at least one —$CH_2$— may be replaced by —O—, —COO—, —OCO— or —OCOO—, at least one —$CH_2$—$CH_2$— may be replaced by —CH═CH— or —C≡C—, and in the groups, at least one hydrogen may be replaced by fluorine or chlorine; a is 1 or 2; and b, c and d are independently an integer from 1 to 4, in which, when a is 2, one of c may be 0.

Item 2. The liquid crystal composition of item 1, wherein the polymerizable compound is at least one compound selected from the group of compounds represented by formula (1-1):

(1-1)

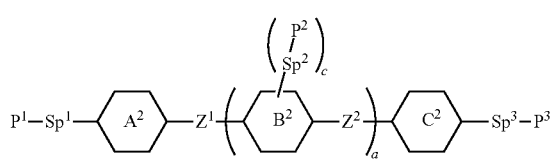

wherein, in formula (1-1), ring $A^2$, ring $B^2$ and ring $C^2$ are independently 1,4-cyclohexylene, 1,4-cyclohexenylene, 1,4-phenylene, naphthalene-1,2-diyl, naphthalene-1,4-diyl, naphthalene-1,5-diyl, naphthalene-1,7-diyl, naphthalene-1,8-diyl, naphthalene-2,3-diyl or naphthalene-2,6-diyl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen; $Z^1$ and $Z^2$ are independently a single bond, —COO—, —CH=CH—, —CH=CH—COO—, —C(CH$_3$)=CH—COO—, —CH=C(CH$_3$)—COO—, —C(CH$_3$)=C(CH$_3$)—COO—, —COCH=CH—, —C(CH$_3$)=C(CH$_3$)—, —CH=CH—CH$_2$O—, —CH=CH—OCH$_2$— or —CO—; $P^1$, $P^2$ and $P^3$ are independently acryloyloxy or methacryloyloxy; $Sp^1$, $Sp^2$ and $Sp^3$ are independently a single bond or alkylene having 1 to 10 carbons, and in the alkylene, at least one —CH$_2$— may be replaced by —O—, —COO—, —OCO— or —OCOO—, at least one —CH$_2$—CH$_2$— may be replaced by —CH=CH— or —C≡C—, and in the groups, at least one hydrogen may be replaced by fluorine or chlorine; a is 1 or 2; and c is an integer from 1 to 4, in which, when a is 2, one of c may be 0.

Item 3. The liquid crystal composition of any one of item 1 or 2, wherein the polymerizable compound is at least one compound selected from the group of compounds represented by formulas (1-1-1) to (1-1-6):

(1-1-1)

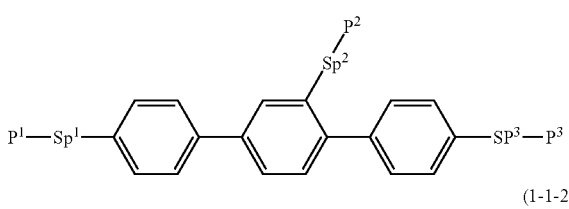

(1-1-2)

(1-1-3)

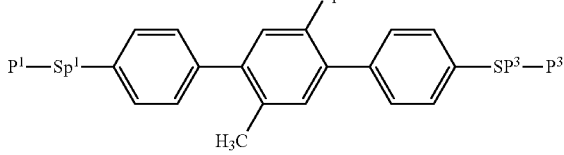

(1-1-4)

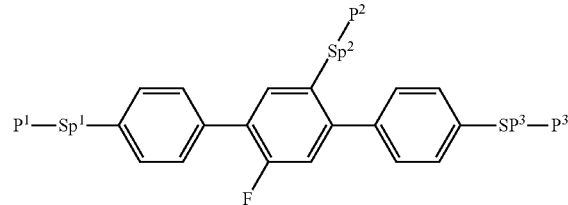

(1-1-5)

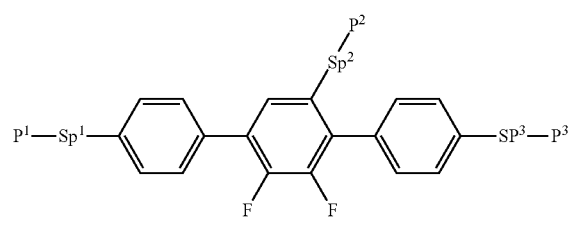

(1-1-6)

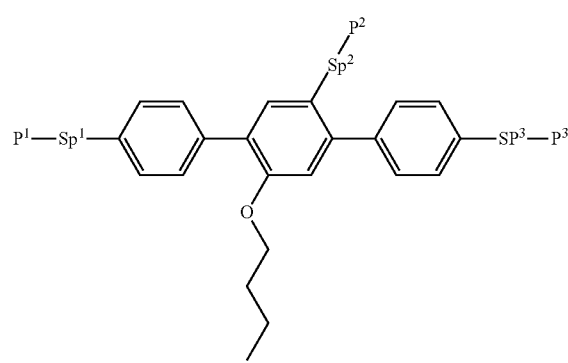

wherein, in formula (1-1-1) to formula (1-1-6), $P^1$, $P^2$ and $P^3$ are independently acryloyloxy or methacryloyloxy; and $Sp^1$, $Sp^2$ and $Sp^3$ are independently a single bond or alkylene having 1 to 10 carbons, and in the alkylene, at least one —CH$_2$— may be replaced by —O—, —COO—, —OCO— or —OCOO—, at least one —CH$_2$—CH$_2$— may be replaced by —CH=CH— or —C≡C—, and in the groups, at least one hydrogen may be replaced by fluorine or chlorine.

Item 4. The liquid crystal composition of any one of items 1 to 3, wherein $P^1$, $P^2$ and $P^3$ are methacryloyloxy, and $Sp'$, $Sp^2$ and $Sp^3$ are a single bond.

Item 5. The liquid crystal composition of any one of items 1 to 6, containing at least one compound selected from the group of compounds represented by formula (2) as a first component:

(2)

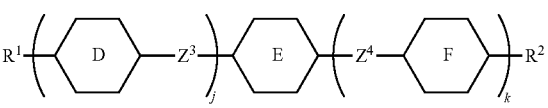

wherein, in formula (2), $R^1$ and $R^2$ are independently alkyl having 1 to 12 carbons, alkoxy having 1 to 12 carbons, alkenyl having 2 to 12 carbons or alkenyloxy having 2 to 12 carbons; ring D and ring F are independently 1,4-cyclohexylene, 1,4-phenylene, 1,4-phenylene in which at least one hydrogen is replaced by fluorine or chlorine, or tetrahydropyran-2,5-diyl; ring E is 2, 3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, —CH$_2$CH$_2$—, —CH$_2$O—, —OCH$_2$—, —COO— or —OCO—; and j is 1, 2 or 3, k is 0 or 1, and a sum of j and k is 3 or less.

Item 6. The liquid crystal composition of any one of items 1 to 5, containing at least one compound selected from the group of compounds represented by formulas (2-1) to (2-19) as the first component:

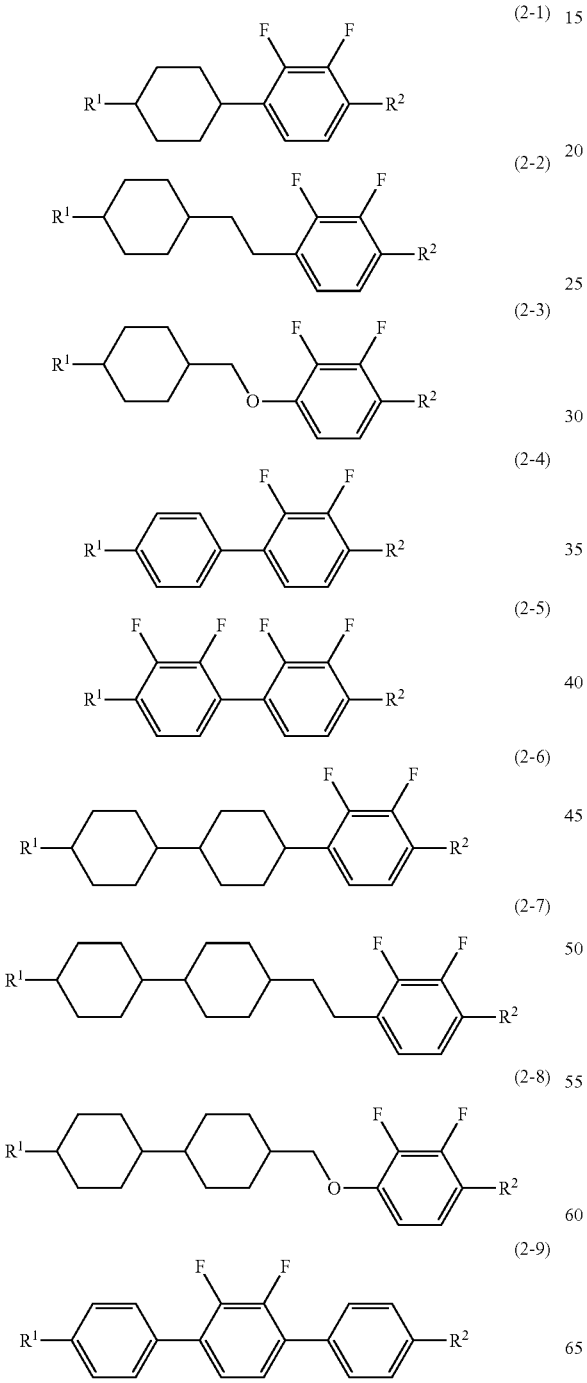
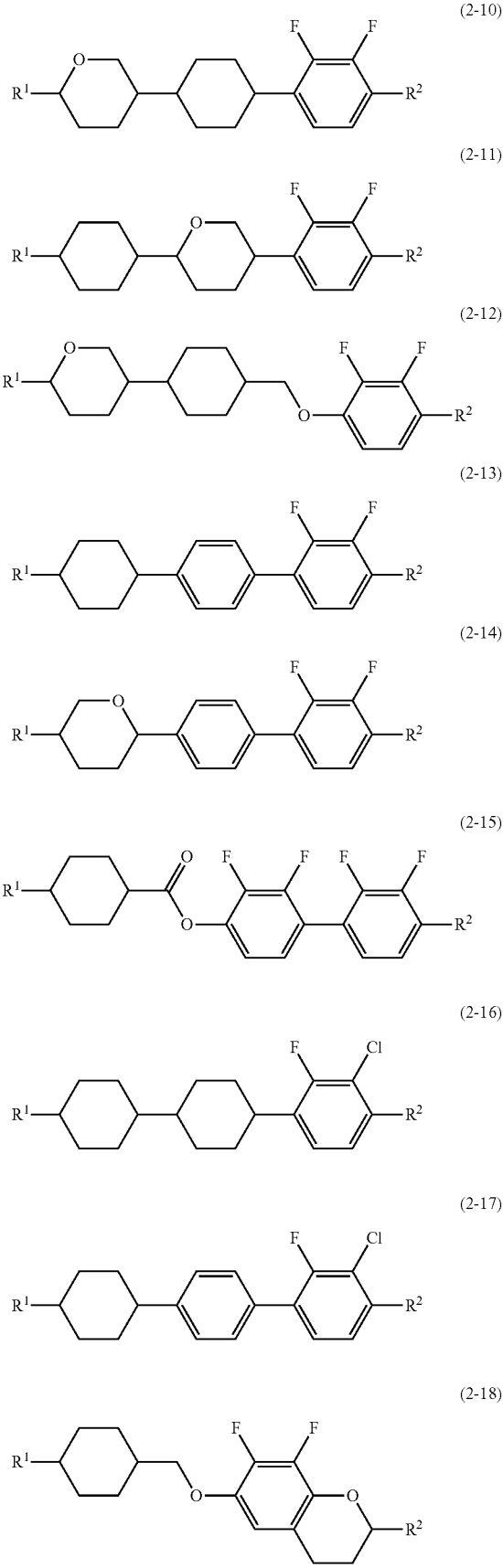

-continued (2-19)

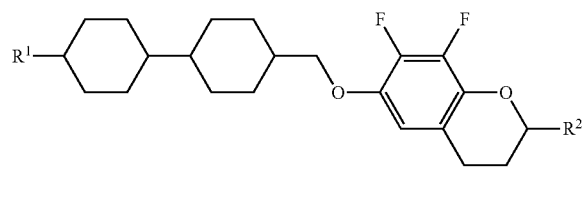

wherein, in formulas (2-1) to (2-19), $R^1$ and $R^2$ are independently alkyl having 1 to 12 carbons, alkoxy having 1 to 12 carbons, alkenyl having 2 to 12 carbons or alkenyloxy having 2 to 12 carbons.

Item 7. The liquid crystal composition of item 5 or 6, wherein a proportion of the first component is in the range of 10 wt % to 90 wt % based on the weight of the liquid crystal composition.

Item 8. The liquid crystal composition of any one of items 1 to 7, containing at least one compound selected from the group of compounds represented by formula (3) as a second component:

(3)

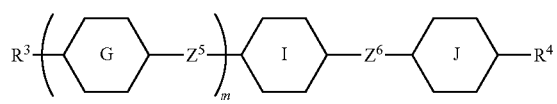

wherein, in formula (3), $R^3$ and $R^4$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine; ring G, ring I and ring J are independently 1,4-cyclohexylene, 1,4-phenylene or 2-fluoro-1,4-phenylene; $Z^5$ and $Z^6$ are independently a single bond, —CH$_2$CH$_2$—, —CH$_2$O—, —OCH$_2$—, —COO— or —OCO—; and m is 0, 1 or 2.

Item 9. The liquid crystal composition of any one of items 1 to 8, containing at least one compound selected from the group of compounds represented by formulas (3-1) to (3-13) as the second component:

(3-1)
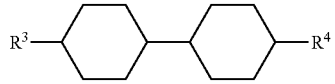

(3-2)
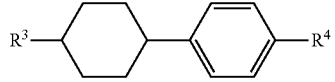

(3-3)
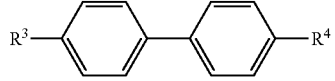

(3-4)
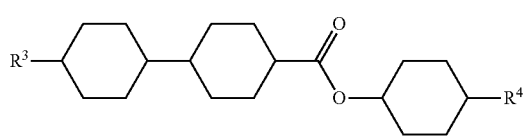

(3-5)

(3-6)

(3-7)

(3-8)
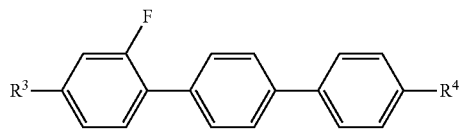

(3-9)
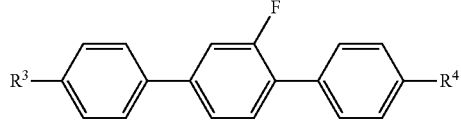

(3-10)

(3-11)
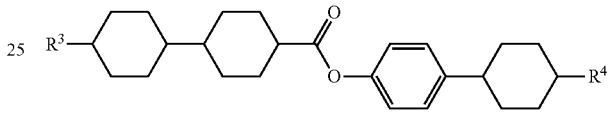

(3-12)
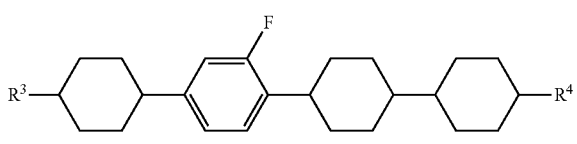

(3-13)
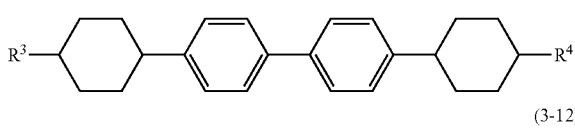

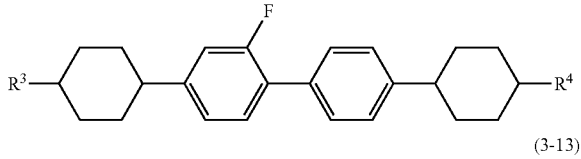

wherein, in formulas (3-1) to (3-13), $R^3$ and $R^4$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine.

Item 10. The liquid crystal composition of item 8 or 9, wherein a proportion of the second component is in the range of 10 wt % to 90 wt % based on the weight of the liquid crystal composition.

Item 11. The liquid crystal composition of any one of items 1 to 10, further containing at least one polymerizable compound selected from the group of compounds represented by formula (4):

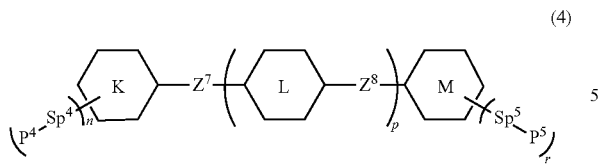
(4)

wherein, in formula (4), $P^4$ and $P^5$ are independently a polymerizable group selected from the group represented by formula (P-4) and formula (P-5);

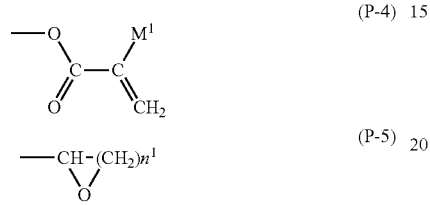

wherein, in formula (P-4), $M^1$ is hydrogen, fluorine, methyl or trifluoromethyl;
in formula (P-5), $n^1$ is 1, 2, 3 or 4; and
in formula (4), $Sp^4$ and $Sp^5$ are independently a single bond or alkylene having 1 to 12 carbons, in the alkylene, at least one —CH$_2$— may be replace by —O—, —S—, —NH—, —CO—, —COO—, —OCO— or —OCOO—, at least one —CH$_2$—CH$_2$— may be replaced by —CH=CH— or —C≡C—, and in the groups, at least one hydrogen may be replaced by halogen or —C≡N; $Z^7$ is a single bond, —CH$_2$CH$_2$—, —CH$_2$O—, —OCH$_2$—, —COO—, —OCO—, —CO—CR$^5$=CR$^6$—, —CR$^6$=CR$^5$—CO—, —OCO—CR$^5$=CR$^6$—, —CR$^6$=CR$^5$—COO—, —CR$^5$=CR$^6$— or —C(=CR$^5$R$^6$)—, in which R$^5$ and R$^6$ are independently hydrogen, halogen, alkyl having 1 to 10 carbons, or alkyl having 1 to 10 carbons in which at least one hydrogen is replaced by fluorine; $Z^8$ is a single bond, —CH$_2$CH$_2$—, —CH$_2$O—, —OCH$_2$—, —COO— or —OCO—; ring K and ring M are independently cyclohexyl, phenyl, 2-fluorophenyl, 3-fluorophenyl, 2,3-difluorophenyl, 2-methylphenyl, 3-methylphenyl, 2-(trifluoromethyl)phenyl, 3-(trifluoromethyl)phenyl or 2-naphthyl; ring L is 1,4-cyclohexylene, 1,4-phenylene, naphthalene-2,6-diyl, 2-fluoro-1,4-phenylene, 2,3-difluoro-1,4-phenylene, 2,5-difluoro-1,4-phenylene, 2-methyl-1,4-phenylene or 2-trifluoromethyl-1,4-phenylene; p is 0, 1 or 2; and n and r are independently 1, 2 or 3, and a sum of n and r is 4 or less.

Item 12. The liquid crystal composition of any one of items 1 to 11, further containing at least one polymerizable compound selected from the group of compounds represented by formulas (4-1) to (4-26):

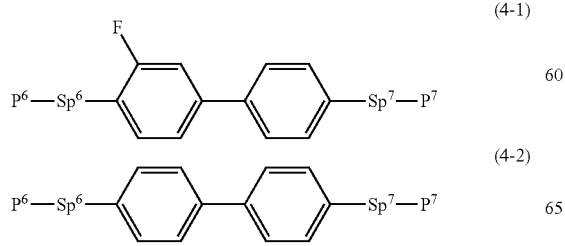

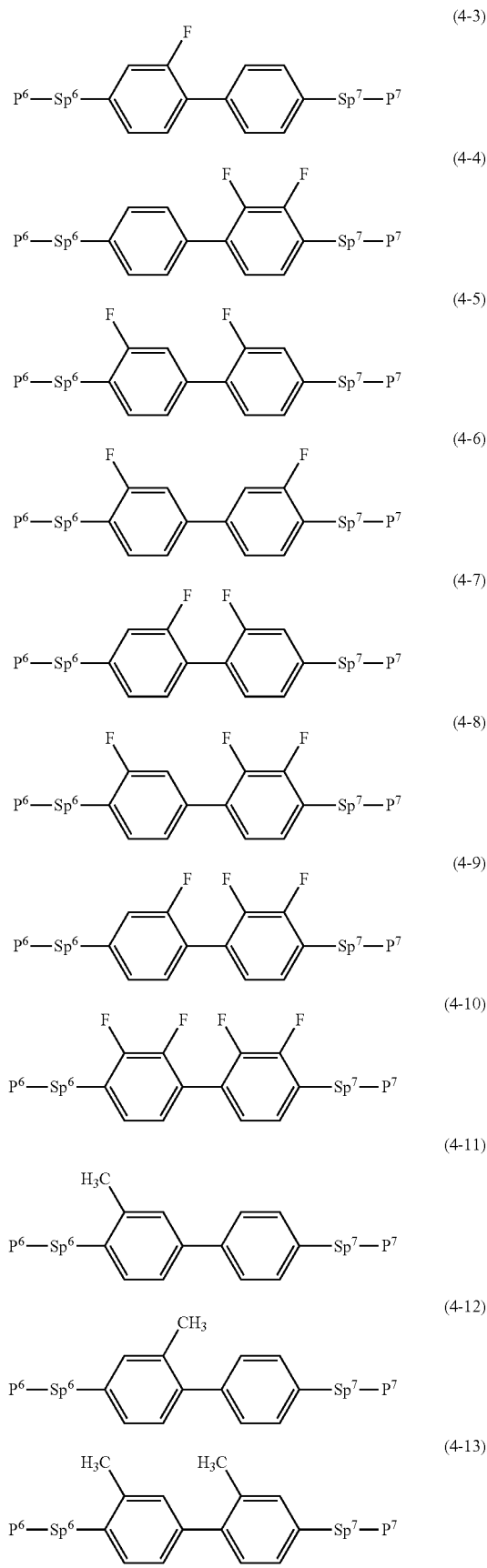

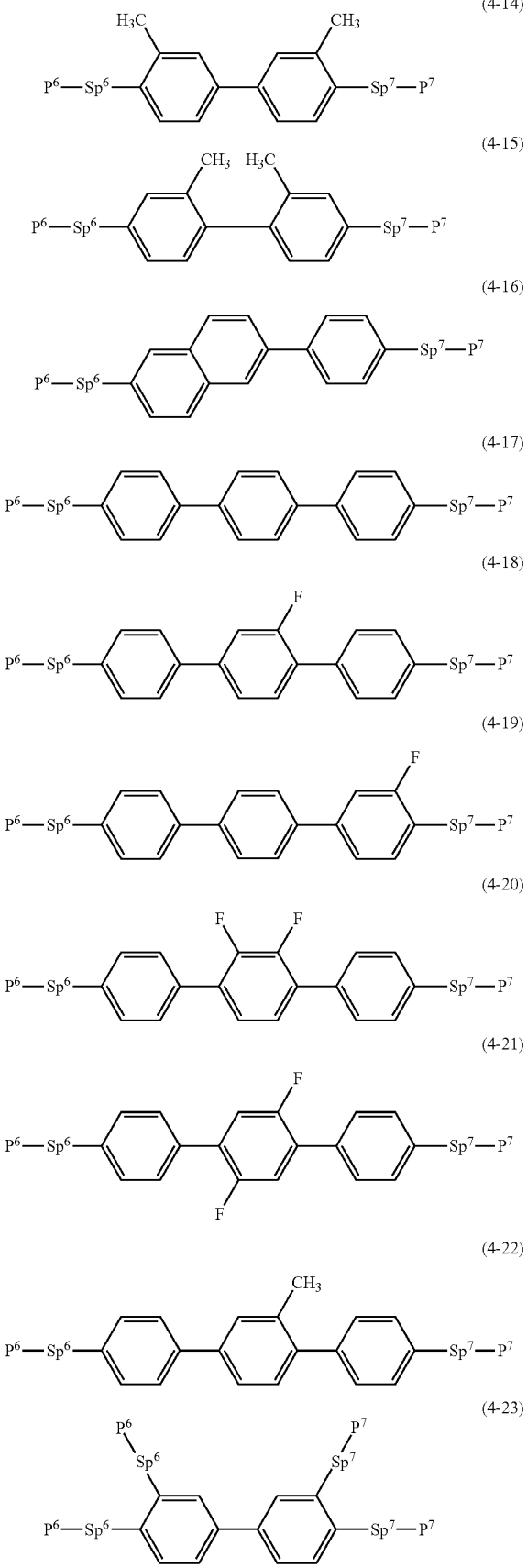
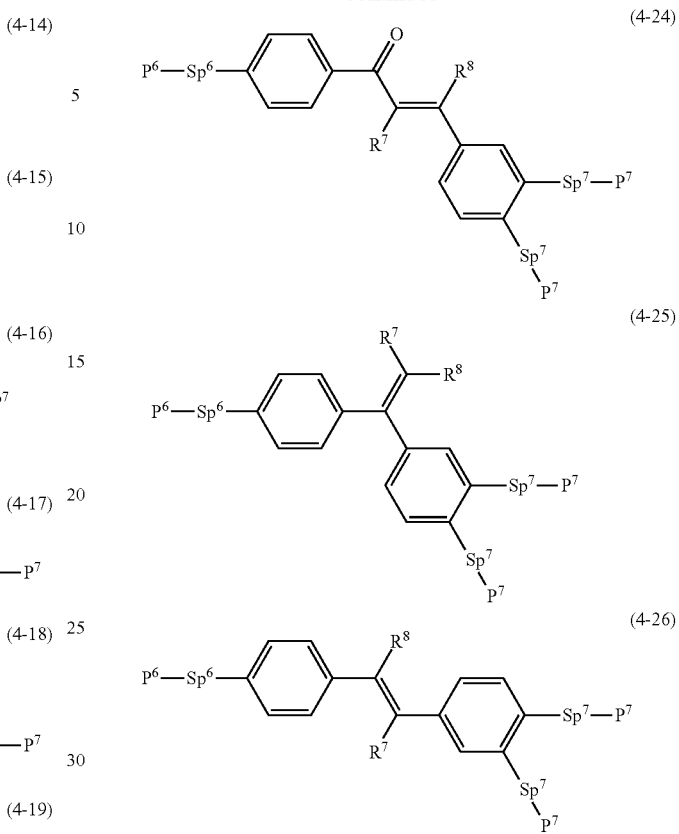

wherein, in formulas (4-1) to (4-26), $P^6$ and $P^7$ are independently polymerizable group represented by formula (P-4);

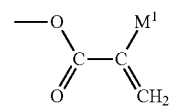

wherein, in formula (P-4), $M^1$ is hydrogen, fluorine, methyl or trifluoromethyl; and
in formulas (4-1) to (4-26), $Sp^6$ and $Sp^7$ are independently a single bond or alkylene having 1 to 12 carbons, and in the alkylene, at least one —CH$_2$— may be replaced by —O—, —COO—, —OCO— or —OCOO—, at least one —CH$_2$—CH$_2$— may be replaced by —CH=CH— or —C≡C—, and in the groups, at least one hydrogen may be replaced by fluorine or chlorine; and $R^7$ and $R^8$ are independently hydrogen, fluorine, chlorine, alkyl having 1 to 3 carbons, or alkyl having 1 to 3 carbons in which at least one hydrogen is replaced by fluorine.

Item 13. The liquid crystal composition of any one of items 1 to 12, wherein a proportion of the polymerizable compound is in the range of 0.03 wt % to 10 wt % based on the weight of the liquid crystal composition.

Item 14. The liquid crystal composition of item 11 or 12, wherein a proportion of the compounds represented by formula (1) and the compounds represented by formula (4) is in the range of 0.03 wt % to 10 wt % based on the weight of the liquid crystal composition.

Item 15. A liquid crystal display device, including the liquid crystal composition of any one of items 1 to 14.

Item 16. The liquid crystal display device of item 15, wherein an operating mode in the liquid crystal display device includes an IPS mode, a VA mode, an FES mode or an FPA mode, and a driving mode in the liquid crystal display device includes an active matrix mode.

Item 17. The liquid crystal display device having a polymer sustained alignment mode, wherein the liquid crystal display device includes the liquid crystal composition of any one of items 1 to 14, and a polymerizable compound in the composition is polymerized.

Item 18. Use of the liquid crystal composition of any one of items 1 to 14 in a liquid crystal display device.

Item 19. Use of the liquid crystal composition of any one of items 1 to 14 in the liquid crystal display device having the polymer sustained alignment mode.

The invention further includes the following items: (a) a method of manufacturing the liquid crystal display device by arranging the liquid crystal composition between two substrates, irradiating the composition with light in a state in which voltage is applied to the composition, and polymerizing the polymerizable compound contained in the composition; and (b) the liquid crystal composition, wherein a maximum temperature of a nematic phase is 70° C. or higher, an optical anisotropy (measured at 25° C.) at a wavelength of 589 nanometers is 0.08 or more and a dielectric anisotropy (measured at 25° C.) at a frequency of 1 kHz is less than −2.

The invention further includes the following items: (c) the composition containing at least one compound selected from the group of compound (5) to compound (7) having a positive dielectric anisotropy as described in JP 2006-199941 A; (d) the composition containing polymerizable compound (1); (e) the composition containing polymerizable compound (1) and compound (4); (f) the composition containing a polymerizable compound different from polymerizable compound (1) and polymerizable compound (4); (g) the composition, further containing at least one of additives such as an optically active compound, an antioxidant, an UV light absorber, a dye, an antifoaming agent, a polymerization initiator or a polymerization inhibitor; (h) an AM device including the composition; (i) a device including the composition and having a TN mode, an ECB mode, an OCB mode, an IPS mode, an FFS mode, a VA mode or an FPA mode; (j) a transmissive device including the composition; (k) use of the composition as a composition having the nematic phase; and (l) use as an optically active composition by adding the optically active compound to the composition.

The composition of the invention will be described in the order described below. First, a constitution of the component compounds in the composition will be described. Second, main characteristics of the component compounds and main effects of the compounds on the composition will be described. Third, a combination of components in the composition, preferred proportions of the components and the basis thereof will be described. Fourth, a preferred embodiment of the component compounds will be described. Fifth, a preferred component compounds will be shown. Sixth, an additive that may be mixed to the composition will be described. Seventh, methods for synthesizing the component compounds will be described. Last, an application of the composition will be described.

First, the constitution of component compounds in the composition will be described. The composition of the invention is classified into composition A and composition B. Composition A may further contain any other liquid crystal compound, additive or the like in addition to the liquid crystal compound selected from compound (2) and compound (3). "Any other liquid crystal compound" means a liquid crystal compound different from compound (2) and compound (3). Such a compound is mixed with the composition for the purpose of further adjusting the characteristics. Of other liquid crystal compounds, a proportion of a cyano compound is preferably as small as possible in view of stability to heat or UV light. A further preferred proportion of the cyano compound is 0 wt %. The additive is the optically active compound, the antioxidant, the UV light absorber, the dye, the antifoaming agent, the polymerizable compound, the polymerization initiator, the polymerization inhibitor or the like.

Composition B consists essentially of liquid crystal compounds selected from compound (2) and compound (3). An expression "essentially" means that the composition may contain the additive such as the polymerizable compound, but does not contain any other liquid crystal compound. Composition B has a smaller number of components than composition A has. Composition B is preferred to composition A in view of cost reduction. Composition A is preferred to composition B in view of possibility of further adjusting the characteristics by mixing any other liquid crystal compound.

Second, the main characteristics of the component compounds and the main effects of the compounds on the characteristics of the composition will be described. The main characteristics of the component compounds are summarized in Table 2 on the basis of advantageous effects of the invention. In Table 2, a symbol L stands for "large" or "high," a symbol M stands for "medium" and a symbol S stands for "small" or "low." The symbols L, M and S represent a classification based on a qualitative comparison among the component compounds, and 0 (zero) means "a value is nearly zero."

TABLE 2

| Characteristics of Compounds | | |
| --- | --- | --- |
| Compound | Compound (2) | Compound (3) |
| Maximum temperature | S to M | S to L |
| Viscosity | L | S to M |
| Optical anisotropy | M to L | S to L |
| Dielectric anisotropy | L[1)] | 0 |
| Specific resistance | L | L |

[1)]A value of dielectric anisotropy is negative, and the symbol shows magnitude of an absolute value Upon mixing the component compounds with the composition, the main effects of the component compounds on the characteristics of the composition are as described below. Compound (1) and compound (4) are polymerized to give a polymer, and the polymer shortens the response time in the device and improves image persistence. Compound (2) as the first component increases the dielectric anisotropy and decreases the minimum temperature. Compound (3) as the second component decreases the viscosity or increases the maximum temperature.

Third, the combination of components in the composition, the preferred proportions of the components and the basis thereof will be described. A preferred combination of components in the composition includes a combination of compound (1) and the first component, a combination of compound (1) and the second component, a combination of compound (1) and the first component and the second component, a combination of compound (1) and the first component and compound (4), or a combination of compound (1) and the first component and the second component and compound (4). A further preferred combination includes the combination of compound (1) and the first component and the second component, or the combination of compound (1) and the first component and the second component and compound (4).

The polymerizable compound such as compound (1) and compound (4) is added to the composition for the purpose of adapting the composition to the polymer sustained alignment mode device. A preferred proportion of the polymerizable compound is about 0.03 wt % or more in order to align the liquid crystal molecules, and about 10 wt % or less in order to prevent poor display in the device. A further preferred proportion is in the range of about 0.1 wt % to about 2 wt %. A particularly preferred proportion is in the range of about 0.2 wt % to about 1.0 wt %.

A preferred proportion of the first component is about 10 wt % or more for increasing the dielectric anisotropy, and about 90 wt % or less for decreasing the viscosity. A further preferred proportion is in the range of about 20 wt % to about 80 wt %. A particularly preferred proportion is in the range of about 30 wt % to about 70 wt %.

A preferred proportion of the second component is about 10 wt % or more for increasing the maximum temperature or decreasing the viscosity, and about 90 wt % or less for decreasing the minimum temperature. A further preferred proportion is in the range of about 20 wt % to about 80 wt %. A particularly preferred proportion is in the range of about 30 wt % to about 70 wt %.

The characteristics of the composition described in Table 1 can be adjusted by adjusting the proportions of the component compounds. The characteristics of the composition may be adjusted by mixing any other liquid crystal compound when necessary. A composition having a maximum temperature of about 70° C. or higher can be prepared by such a method. A composition having a maximum temperature of about 75° C. or higher can also be prepared. A composition having a maximum temperature of about 80° C. or higher can also be prepared. A composition having a minimum temperature of about −10° C. or lower can also be prepared by such a method. A composition having a minimum temperature of about −20° C. or lower can also be prepared. A composition having a minimum temperature of about −30° C. or lower can also be prepared.

A composition having optical anisotropy (measured at 25° C.) at a wavelength of 589 nanometers in the range of about 0.09 to about 0.12 can also be prepared by such a method. A composition having optical anisotropy in the range of about 0.08 to about 0.16 can also be prepared. A composition having optical anisotropy in the range of about 0.07 to about 0.20 can also be prepared. A composition having dielectric anisotropy (measured at 25° C.) of about −1.5 or less at a frequency of 1 kHz can also be prepared by such a method. A composition having dielectric anisotropy of about −2 or less can also be prepared. A composition having dielectric anisotropy of about −2.5 or less can also be prepared.

Fourth, the preferred embodiment of the component compounds will be described. In formula (1) and formula (1-1), ring $A^1$ and ring $C^1$ are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen. Preferred ring $A^1$ or ring $C^1$ is phenyl. Ring $B^1$ is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen.

Preferred ring $B^1$ is 1,4-phenylene, naphthalene-2,6-diyl, 2-fluoro-1,4-phenylene, 2,3-difluoro-1,4-phenylene or 2-methyl-1,4-phenylene. Further preferred ring $B^1$ is 1,4-phenylene. Ring $A^2$, ring $B^2$ and ring $C^2$ are independently 1,4-cyclohexylene, 1,4-cyclohexenylene, 1,4-phenylene, naphthalene-1,2-diyl, naphthalene-1,4-diyl, naphthalene-1,5-diyl, naphthalene-1,7-diyl, naphthalene-1,8-diyl, naphthalene-2,3-diyl or naphthalene-2,6-diyl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen. Preferred ring $A^2$ or ring $C^2$ is phenyl. Preferred ring $B^2$ is 1,4-phenylene, naphthalene-2,6-diyl, 2-fluoro-1,4-phenylene, 2,3-difluoro-1,4-phenylene or 2-methyl-1,4-phenylene. Further preferred ring $B^2$ is 1,4-phenylene.

$Z^1$ and $Z^2$ are independently a single bond or alkylene having 1 to 10 carbons, and in the alkylene, at least one —$CH_2$— may be replaced by —O—, —CO—, —COO— or —OCO—, at least one —$CH_2$—$CH_2$— may be replaced by —CH=CH—, —C(CH$_3$)=CH—, —CH=C(CH$_3$)— or —C(CH$_3$)=C(CH$_3$)—, and in the groups, at least one hydrogen may be replaced by fluorine or chlorine. Preferred $Z^1$ or $Z^2$ is a single bond, —$CH_2CH_2$—, —$CH_2O$—, —$OCH_2$—, —COO— or —OCO—. Further preferred $Z^1$ or $Z^2$ is a single bond.

$P^1$, $P^2$ and $P^3$ are independently acryloyloxy or methacryloyloxy. Preferred $P^1$, $P^2$ and $P^3$ are methacryloyloxy.

$Sp^1$, $Sp^2$ and $Sp^3$ are independently a single bond or alkylene having 1 to 10 carbons, and in the alkylene, at least one —$CH_2$— may be replaced by —O—, —COO—, —OCO— or —OCOO—, at least one —$CH_2$—$CH_2$— may be replaced by —CH=CH— or —C≡C—, and in the groups, at least one hydrogen may be replaced by fluorine or chlorine. Preferred $Sp^1$, $Sp^2$ or $Sp^3$ is a single bond.

Then, a is 1 or 2. Preferred a is 1. Then, b, c and d are independently an integer from 1 to 4, in which, when a is 2, one of c may be 0. Preferred b, c and d are 1 or 2.

In formula (2) and formula (3), $R^1$ and $R^2$ are independently alkyl having 1 to 12 carbons, alkoxy having 1 to 12 carbons, alkenyl having 2 to 12 carbons, or alkenyloxy having 2 to 12 carbons. Preferred $R^1$ or $R^2$ is alkyl having 1 to 12 carbons for increasing a stability, and alkoxy having 1 to 12 carbons for increasing a dielectric anisotropy. $R^3$ and $R^4$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine. Preferred $R^3$ or $R^4$ is alkenyl having 2 to 12 carbons for decreasing a viscosity, and alkyl having 1 to 12 carbons for increasing the stability.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH═CH— in the alkenyl depends on a position of a double bond. Trans is preferred in alkenyl such as 1-propenyl, 1-butenyl, 1-pentenyl, 1-hexenyl, 3-pentenyl and 3-hexenyl for decreasing the viscosity, for instance. Cis is preferred in alkenyl such as 2-butenyl, 2-pentenyl and 2-hexenyl.

Preferred alkenyloxy is vinyloxy, allyloxy, 3-butenyloxy, 3-pentenyloxy or 4-pentenyloxy. Further preferred alkenyloxy is allyloxy or 3-butenyloxy for decreasing the viscosity.

Preferred examples of alkenyl in which at least one hydrogen is replaced by fluorine include 2,2-difluorovinyl, 3,3-difluoro-2-propenyl, 4,4-difluoro-3-butenyl, 5,5-difluoro-4-pentenyl or 6,6-difluoro-5-hexenyl. Further preferred examples include 2,2-difluorovinyl or 4,4-difluoro-3-butenyl for decreasing the viscosity.

Alkyl has a straight-chain or a branched-chain and contains no cyclic alkyl. Straight-chain alkyl is preferred to branched-chain alkyl. A same rule applies also to alkoxy, alkenyl, and alkenyl in which at least one hydrogen is replaced by fluorine. With regard to a configuration of 1,4-cyclohexylene, trans is preferred to cis for increasing the maximum temperature.

Ring D and ring F are independently 1,4-cyclohexylene, 1,4-phenylene, 1,4-phenylene in which at least one hydrogen is replaced by fluorine or chlorine, or tetrahydropyran-2,5-diyl. Preferred ring D or ring F is 1,4-cyclohexylene for decreasing the viscosity, tetrahydropyran-2,5-diyl for increasing the dielectric anisotropy, and 1,4-phenylene for increasing the optical anisotropy. With regard to the configuration of 1,4-cyclohexylene, trans is preferred to cis for increasing the maximum temperature. Tetrahydropyran-2,5-diyl includes:

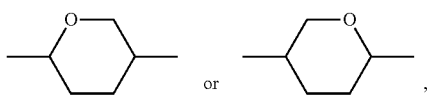

preferably

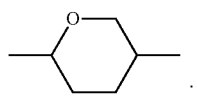

Ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Preferred ring E is 2,3-difluoro-1,4-phenylene for decreasing the viscosity, 2-chloro-3-fluoro-1,4-phenylene for decreasing the optical anisotropy and 7,8-difluorochroman-2,6-diyl for increasing the dielectric anisotropy.

Ring G, ring I and ring J are independently 1,4-cyclohexylene, 1,4-phenylene or 2-fluoro-1,4-phenylene. Preferred ring G, ring I or ring J is 1,4-cyclohexylene for decreasing the viscosity or increasing the maximum temperature, and 1,4-phenylene for decreasing the minimum temperature.

$Z^3$, $Z^4$, $Z^5$ and $Z^6$ are independently a single bond, —CH$_2$CH$_2$—, —CH$_2$O—, —OCH$_2$—, —COO— or —OCO—. Preferred $Z^3$ or $Z^4$ is a single bond for decreasing the viscosity, —CH$_2$CH$_2$— for decreasing the minimum temperature and —CH$_2$O— or —OCH$_2$— for increasing the dielectric anisotropy. Preferred $Z^5$ or $Z^6$ is a single bond for decreasing the viscosity, —CH$_2$CH$_2$— for decreasing the minimum temperature and —COO— or —OCO— for increasing the maximum temperature.

Then, j is 1, 2 or 3. Preferred j is 1 for decreasing the viscosity, and 2 or 3 for increasing the maximum temperature. Then, k is 0 or 1. Preferred k is 0 for decreasing the viscosity, and 1 for decreasing the minimum temperature. Then, m is 0, 1 or 2. Preferred m is 0 for decreasing the viscosity, and 1 or 2 for increasing the maximum temperature.

In formula (4), $P^6$ and $P^7$ are independently a polymerizable group selected from the group of the groups represented by formula (P-4) and formula (P-5).

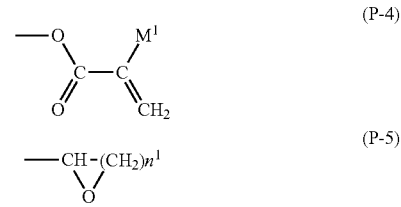

wherein, in formula (P-4), $M^1$ is hydrogen, fluorine, methyl or trifluoromethyl. Preferred $M^1$ is hydrogen or methyl for increasing reactivity. Further preferred $M^1$ is methyl. In formula (P-5), $n^1$ is 1, 2, 3 or 4. Preferred $n^1$ is 1 or 2 for increasing reactivity. Further preferred $n^1$ is 1. When both $P^6$ and $P^7$ are a polymerizable group represented by formula (P-4), a group represented by $M^1$ in $P^6$ and a group represented by $M^1$ in $P^7$ may be identical or different.

$Sp^4$ and $Sp^5$ are independently a single bond or alkylene having 1 to 12 carbons, in the alkylene, at least one —CH$_2$— may replace by —O—, —S—, —NH—, —CO—, —COO—, —OCO— or —OCOO—, at least one —CH$_2$CH$_2$— may be replaced by —CH═CH— or —C≡C—, and in the groups, at least one hydrogen may be replaced by halogen or —C≡N. A total of the number of carbons in alkylene in which any one of hydrogen is replaced by —C≡N is preferably 12 or less. Preferred $Sp^4$ or $Sp^5$ is a single bond.

$Z^7$ is a single bond, —CH$_2$CH$_2$—, —CH$_2$O—, —OCH$_2$—, —COO—, —OCO—, —CO—CR$^5$═CR$^6$—, —CR$^6$═CR$^5$—CO—, —OCO—CR$^5$═CR$^6$—, —CR$^6$═CR$^5$—COO—, —CR$^5$═CR$^6$— or —C(═CR$^5$R$^6$)—, in which $R^5$ and $R^6$ are independently hydrogen, halogen, alkyl having 1 to 10 carbons, or alkyl having 1 to 10 carbons in which at least one hydrogen is replaced by fluorine. Preferred $R^5$ or $R^6$ is hydrogen, fluorine or alkyl having 1 to 3 carbons. $Z^8$ is a single bond, —CH$_2$CH$_2$—, —CH$_2$O—, —OCH$_2$—, —COO— or —OCO—. Preferred $Z^7$ or $Z^8$ is a single bond, —CH$_2$CH$_2$—, —CH$_2$O—, —OCH$_2$—, —COO— or —OCO—. Further preferred $Z^7$ or $Z^8$ is a single bond.

Ring K and ring M are independently cyclohexyl, phenyl, 2-fluorophenyl, 3-fluorophenyl, 2,3-difluorophenyl, 2-methylphenyl, 3-methylphenyl, 2-(trifluoromethyl)phenyl, 3-(trifluoromethyl)phenyl or 2-naphthyl. Preferred ring K or ring M is phenyl. Ring L is 1,4-cyclohexylene, 1,4-phenylene, naphthalene-2,6-diyl, 2-fluoro-1,4-phenylene, 2,3-difluoro-1,4-phenylene, 2,5-difluoro-1,4-phenylene, 2-methyl-1,4-phenylene or 2-trifluoromethyl-1,4-phenylene. Preferred ring L is 1,4-phenylene, naphthalene-2,6-diyl, 2-fluoro-1,4-phenylene, 2,3-difluoro-1,4-phenylene or 2-methyl-1,4-phenylene. Particularly preferred ring L is 1,4-phenylene or 2-fluoro-1,4-phenylene.

Then, p is 0, 1 or 2, n is 1, 2 or 3, r is 1, 2 or 3, and a sum of n and r is 4 or less. Preferred p is 0. Preferred n or r is 1 or 2.

Fifth, the preferred component compounds will be shown. Preferred compound (1) is compound (1-1) described above. Further preferred compound (1) is compound (1-1-1) to compound (1-1-6) described above. Particularly preferred compound (1) is compound (1-1-1) and compound (1-1-3) described above. A preferred composition contains compound (1-1-1) to compound (1-1-6). A further preferred composition contains compound (1-1-1) and compound (1-1-3).

Preferred compound (2) includes compound (2-1) to compound (2-19) described above. In the compounds, at least one of the first component preferably includes compound (2-1), compound (2-3), compound (2-4), compound (2-6), compound (2-8) or compound (2-13). At least two of the first component preferably includes a combination of compound (2-1) and a compound (2-6), a combination of compound (2-1) and compound (2-13), a combination of compound (2-3) and compound (2-6), a combination of compound (2-3) and compound (2-13), or a combination of compound (2-4) and compound (2-8).

Preferred compound (3) includes compound (3-1) to compound (3-13) described above. In the compounds, at least one of the second component preferably includes compound (3-1), compound (3-3), compound (3-5), compound (3-6), compound (3-7) or compound (3-8). At least two of the second component preferably includes a combination of compound (3-1) and compound (3-3), a combination of compound (3-1) and compound (3-5), or a combination of compound (3-1) and compound (3-6).

Preferred compound (4) includes compound (4-1) to compound (4-26) described above. A preferred composition contains compound (4-1), compound (4-2) or compound (4-18). A further preferred composition contains compound (4-1) and compound (4-2), compound (4-1) and compound (4-18), or compound (4-2) and compound (4-18).

Sixth, the additive that may be added to the composition will be described. Such an additive includes the optically active compound, the antioxidant, the UV light absorber, the dye, the antifoaming agent, the polymerizable compound, the polymerization initiator, the polymerization inhibitor or the like.

The optically active compound is added to the composition for inducing a helical structure in a liquid crystal to give a twist angle. Examples of such a compound include compounds (5-1) to (5-5). A preferred proportion of the optically active compound is about 5 wt % or less. A further preferred proportion is in the range of about 0.01 wt % to about 2 wt %.

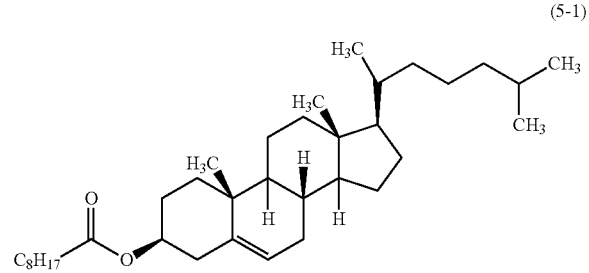

(5-1)

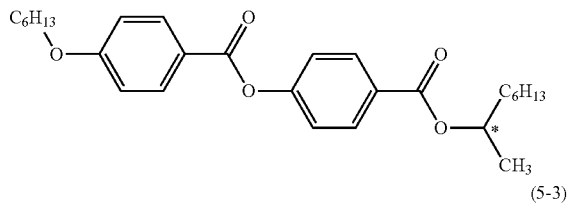

(5-2)

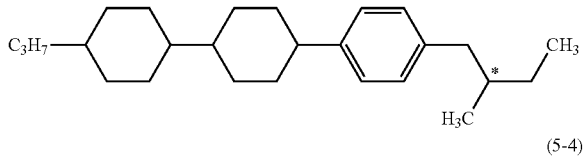

(5-3)

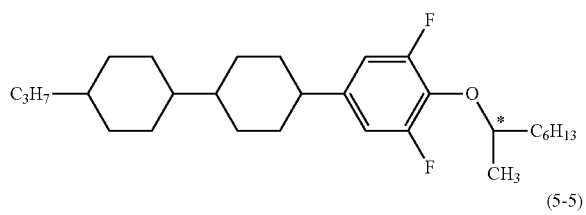

(5-4)

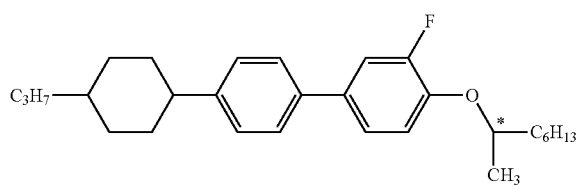

(5-5)

The antioxidant is added to the composition for preventing a decrease in the specific resistance caused by heating in air, or for maintaining a large voltage holding ratio at room temperature and also at the temperature close to the maximum temperature after the device has been used for a long period of time.

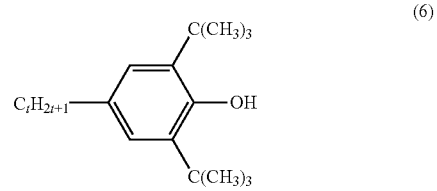

(6)

Preferred examples of the antioxidant include compound (6) where t is an integer from 1 to 9 or the like. In compound (6), preferred t is 1, 3, 5, 7 or 9. Further preferred t is 1 or 7. Compound (6) where t is 1 is effective for preventing the decrease in the specific resistance caused by heating in air because the compound (6) has a large volatility. Compound (6) where t is 7 is effective for maintaining the large voltage holding ratio at room temperature and also at the temperature close to the maximum temperature even after the device has been used for a long period of time because the compound (6) has a small volatility. A preferred proportion of the antioxidant is about 50 ppm or more for achieving an effect thereof, and about 600 ppm or less for avoiding a decrease in the maximum temperature or an increase in the minimum temperature. A further preferred proportion is in the range of about 100 ppm to about 300 ppm.

Preferred examples of the UV light absorber include a benzophenone derivative, a benzoate derivative and a triazole derivative. A light stabilizer such as an amine having steric hindrance is also preferred. A preferred proportion of the absorber or the stabilizer is about 50 ppm or more for achieving an effect thereof, and about 10,000 ppm or less for avoiding the decrease in the maximum temperature or avoiding the increase in the minimum temperature. A further preferred proportion is in the range of about 100 ppm to about 10,000 ppm.

A dichroic dye such as an azo dye or an anthraquinone dye is added to the composition for the purpose of adapting the composition to a device having a guest host (GH) mode. A preferred proportion of the dye is in the range of about 0.01 wt % to about 10 wt %. The antifoaming agent such as dimethyl silicone oil or methyl phenyl silicone oil is added to the composition for preventing foam formation. A preferred proportion of the antifoaming agent is about 1 ppm or more for achieving an effect thereof, and about 1,000 ppm or less for avoiding a poor display. A further preferred proportion is in the range of about 1 ppm to about 500 ppm.

The polymerizable compound is added to the composition for the purpose of adapting the composition to a device having the polymer sustained alignment (PSA) mode. Compound (1) and compound (4) are suitable for the purpose. A polymerizable compound different from compound (1) and compound (4) may be added to the composition together with compound (1) and compound (4). Preferred examples of other polymerizable compounds include a compound such as acrylate, methacrylate, a vinyl compound, a vinyloxy compound, propenyl ether, an epoxy compound (oxirane, oxetane) and vinyl ketone. Further preferred examples include an acrylate derivative or a methacrylate derivative. When adding other polymerizable compounds to the composition, a preferred proportion of compound (1) or a preferred proportion of the combination of compound (1) and compound (4) is about 10 wt % or more based on the total weight of the polymerizable compound. A further preferred proportion is about 50 wt % or more based thereon. A particularly preferred proportion is about 80 wt % or more based thereon. A particularly preferred proportion is also 100 wt % based thereon.

The polymerizable compound such as compound (1) or compound (4) is polymerized by irradiation with UV light. The polymerizable compound may be polymerized in the presence of a suitable initiator such as a photopolymerization initiator. Suitable conditions for polymerization, suitable types of the initiator and suitable amounts thereof are known to those skilled in the art and are described in literature. For example, Irgacure 651 (registered trademark; BASF), Irgacure 184 (registered trademark; BASF) or Darocur 1173 (registered trademark; BASF), each being a photoinitiator, is suitable for radical polymerization. A preferred proportion of the photopolymerization initiator is in the range of about 0.1 wt % to about 5 wt % based on the total weight of the polymerizable compound. A further preferred proportion is in the range of about 1 wt % to about 3 wt % based thereon.

Upon storing the polymerizable compound such as compound (1) or compound (4), the polymerization inhibitor may be added thereto for preventing polymerization. The polymerizable compound is ordinarily added to the composition without removing the polymerization inhibitor. Examples of the polymerization inhibitor include hydroquinone and a hydroquinone derivative such as methylhydroquinone, 4-tert-butylcatechol, 4-methoxyphenol or phenothiazine.

Seventh, the methods for synthesizing the component compounds will be described. The compounds can be prepared according to known methods. Examples of the synthetic methods are described. Compound (2-1) is prepared by a method described in JP 2000-053602 A. Compound (3-1) and compound (3-5) are prepared by a method described in JP S59-176221 A. Compound (4) is prepared with reference to JP 2012-001526 A and WO 2010-131600 A. Compound (4-18) is prepared by a method described in JP H7-101900 A. The antioxidant is commercially available. A compound where t in formula (6) is 1 can be obtained from Sigma-Aldrich Corporation. A compound where t in compound (6) is 7 or the like can be prepared according to a method described in U.S. Pat. No. 3,660,505 B.

Any compounds whose synthetic methods are not described can be prepared according to methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared according to publicly known methods using the thus obtained compounds. For example, the component compounds are mixed and dissolved in each other by heating.

Last, the application of the composition will be described. The composition of the invention mainly has a minimum temperature of about −10° C. or lower, a maximum temperature of about 70° C. or higher, and an optical anisotropy in the range of about 0.07 to about 0.20. A device including the composition has the large voltage holding ratio. The composition is suitable for use in the AM device. The composition is particularly suitable for use in a transmissive AM device. The composition can be used as the composition having the nematic phase, and as the optically active composition by adding the optically active compound.

The composition can be used for the AM device. The composition can also be used for a PM device. The composition can also be used for the AM device and the PM device each having a mode such as a PC mode, the TN mode, a STN mode, the ECB mode, the OCB mode, the IPS mode, the FFS mode, the VA mode and the FPA mode. Use for the AM device having the IPS mode, the FFS mode or the VA mode is particularly preferred. The device may be of a reflective type, a transmissive type or a transflective type. Use for the transmissive device is preferred. Use for an amorphous silicon-TFT device or a polycrystal silicon-TFT device is allowed. The composition can also be used for a polymer dispersed (PD) device in which a three-dimensional network-polymer is formed in the composition by increasing an adding amount of a polymerizable compound.

One example of the method for manufacturing the device having the polymer sustained alignment mode is as described below. A device having two substrates referred to as an array substrate and a color filter substrate is prepared. At least one of the substrates has an electrode layer. The liquid crystal composition is prepared by mixing the liquid crystal compounds. The polymerizable compound is added to the composition. The additive may be further added when necessary. The composition is injected into the device. The device is irradiated with light in a state in which voltage is applied. Irradiation with UV light is preferred. The polymerizable compound is polymerized by irradiation with light. The composition containing the polymer is formed by the polymerization. The liquid crystal display device having the polymer sustained alignment mode is manufactured in such a procedure.

In the procedure, when voltage is applied, the liquid crystal molecules are aligned due to an effect of an electric field. Molecules of the polymerizable compound are also aligned according to the alignment. The polymerizable compound is polymerized by irradiation with UV light in the above state, and therefore the polymer in which the alignment is maintained is formed. The response time of the device is shortened due to an effect of the polymer. The image persistence is caused due to poor operation in the liquid crystal molecules, and therefore is to be simultaneously improved by the effect of the polymer. In addition, the polymerizable compound in the composition is previously polymerized, and the composition may be arranged between the substrates in the LCD device.

EXAMPLES

The invention will be described in greater detail by way of Examples. However, the invention is not limited by the Examples. The invention includes a mixture of a composition in Example 1 and a composition in Example 2. The invention also includes a mixture in which at least two compositions in Examples are mixed. The thus prepared compound was identified by methods such as an NMR analysis. Characteristics of the compound and the composition were measured by methods described below.

NMR analysis: For measurement, DRX-500 made by Bruker BioSpin Corporation was used. In $^1$H-NMR measurement, a sample was dissolved in a deuterated solvent such as $CDCl_3$, and measurement was carried out under conditions of room temperature, 500 $MH_z$ and 16 times of accumulation. Tetramethylsilane (TMS) was used as an internal standard. In $^{19}$F-NMR measurement, $CFCl_3$ was used as an internal standard, and measurement was carried out under conditions of 24 times of accumulation. In explaining nuclear magnetic resonance spectra obtained, s, d, t, q, quin, sex and m stand for a singlet, a doublet, a triplet, a quartet, a quintet, a sextet and a multiplet, and br being broad, respectively.

Gas chromatographic analysis: GC-14B Gas Chromatograph made by Shimadzu Corporation was used for measurement. A carrier gas was helium (2 mL/per minute). A sample injector and a detector (FID) were set to 280° C. and 300° C., respectively. A capillary column DB-1 (length 30 m, bore 0.32 mm, film thickness 0.25 μm; dimethylpolysiloxane as a stationary phase, non-polar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1 wt %), and then 1 microliter of the solution was injected into the sample injector. A recorder was C-R5A Chromatopac made by Shimadzu Corporation or the equivalent thereof. The resulting gas chromatogram showed a retention time of a peak and a peak area corresponding to each of the component compounds.

As a solvent for diluting the sample, chloroform, hexane or the like may also be used. The following capillary columns may also be used for separating component compounds: HP-1 (length 30 m, bore 0.32 mm, film thickness 0.25 μm) made by Agilent Technologies, Inc., Rtx-1 (length 30 m, bore 0.32 mm, film thickness 0.25 μm) made by Restek Corporation and BP-1 (length 30 m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of avoiding an overlap of peaks of the compounds.

Proportions of liquid crystal compounds contained in the composition may be calculated by the method as described below. The mixture of liquid crystal compounds is detected by gas chromatograph (FID). An area proportion of each peak in the gas chromatogram corresponds to the proportion (weight ratio) of the liquid crystal compound. When the capillary columns described above were used, a correction coefficient of each of the liquid crystal compounds may be regarded as 1 (one). Accordingly, the proportion (wt %) of the liquid crystal compound is calculated from the area proportion of each peak.

Sample for measurement: When characteristics of a composition was measured, the composition was used as a sample as was. Upon measuring characteristics of a compound, a sample for measurement was prepared by mixing the compound (15 wt %) with a base liquid crystal (85 wt %). Values of characteristics of the compound were calculated, according to an extrapolation method, using values obtained by measurement. (Extrapolated value)={(measured value of a sample for measurement)−0.85×(measured value of a base liquid crystal)}/0.15. When a smectic phase (or crystals) precipitates at the ratio thereof at 25° C., a ratio of the compound to the base liquid crystal was changed step by step in the order of (10 wt %:90 wt %), (5 wt %:95 wt %) and (1 wt %:99 wt %). Values of maximum temperature, optical anisotropy, viscosity and dielectric anisotropy with regard to the compound were determined according to the extrapolation method.

A base liquid crystal described below was used. A proportion of the component compound was expressed in terms of weight percent (wt %).

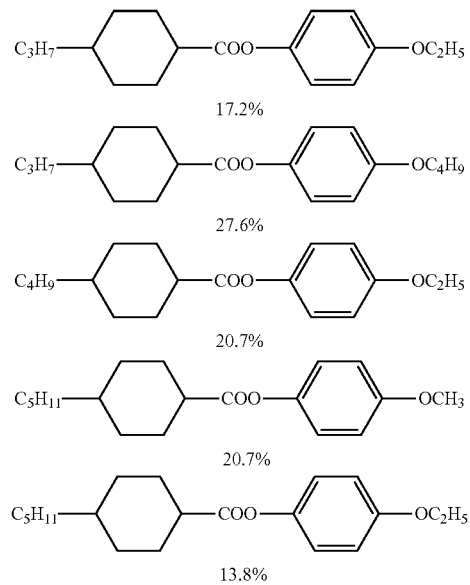

modified thereon. No thin film transistor (TFT) was attached to a TN device used for measurement.

(1) Maximum temperature of nematic phase (NI; °C.): A sample was placed on a hot plate in a melting point apparatus equipped with a polarizing microscope, and heated at a rate of 1° C. per minute. Temperature when part of the sample began to change from a nematic phase to an isotropic liquid was measured. A maximum temperature of the nematic phase may be occasionally abbreviated as "maximum temperature."

(2) Minimum temperature of nematic phase ($T_c$; °C.): Samples each having a nematic phase were put in glass vials and kept in freezers at temperatures of 0° C., −10° C., −20° C., −30° C. and −40° C. for 10 days, and then liquid crystal phases were observed. For example, when the sample maintained the nematic phase at −20° C. and changed to crystals or a smectic phase at −30° C., $T_c$ of the sample was expressed as $T_c$<−20° C. A minimum temperature of the nematic phase may be occasionally abbreviated as "minimum temperature."

(3) Viscosity (bulk viscosity; η; measured at 20° C.; mPa·s): A cone-plate (E type) rotational viscometer made by Tokyo Keiki, Inc. was used for measurement.

(4) Viscosity (rotational viscosity; γ1; measured at 25° C.; mPa·s): Measurement was carried out according to a method described in M. Imai et al., Molecular Crystals and Liquid Crystals, Vol. 259, p. 37 (1995). A sample was put in a VA device in which a distance (cell gap) between two glass substrates was 20 μm. Voltage was applied stepwise to the device in the range of 39 V to 50 V at an increment of 1 V. After a period of 0.2 second with no voltage application, voltage was applied repeatedly under the conditions of only one rectangular wave (rectangular pulse; 0.2 second) and no voltage application (2 seconds). A peak current and a peak time of a transient current generated by the applied voltage were measured. A value of rotational viscosity was obtained from the measured values and a calculation equation (8) described on page 40 of the paper presented by M. Imai et al. Dielectric anisotropy required for the calculation was measured according to section (6) described below.

(5) Optical anisotropy (refractive index anisotropy; Δn; measured at 25° C.): Measurement was carried out by an Abbe refractometer with a polarizing plate mounted on an ocular, using light at a wavelength of 589 nanometers. A surface of a main prism was rubbed in one direction, and then a sample was added dropwise onto the main prism. The refractive index $n_{//}$ was measured when a direction of polarized light was parallel to a direction of rubbing. The refractive index $n_\perp$ was measured when the direction of polarized light was perpendicular to the direction of rubbing. A value of optical anisotropy was calculated from an equation: $\Delta n = n_{//} - n_\perp$.

(6) Dielectric anisotropy (Δ∈; measured at 25° C.): A value of dielectric anisotropy was calculated from an equation: $\Delta\in = \in_{//} - \in_\perp$. The dielectric constants $\in_{//}$ and $\in_\perp$ were measured as described below.

(1) Measurement of the dielectric constant $\in_{//}$: An ethanol (20 mL) solution of octadecyl triethoxysilane (0.16 mL) was applied to a well-cleaned glass substrate. After rotating the glass substrate with a spinner, the glass substrate was heated at 150° C. for 1 hour. A sample was put in a VA device in which a distance (cell gap) between two glass substrates was 4 μm, and the device was sealed with an UV-curable adhesive. Sine waves (0.5 V, 1 kHz) were applied to the device, and after 2 seconds, the dielectric constant $\in_{//}$ a major axis direction of liquid crystal molecules was measured.

(2) Measurement of the dielectric constant $\in_\perp$: A polyimide solution was applied to a well-cleaned glass substrate. After calcining the glass substrate, rubbing treatment was applied to the alignment film obtained. A sample was put in a TN device in which a distance (cell gap) between two glass substrates was 9 μm and a twist angle was 80°. Sine waves (0.5 V, 1 kHz) were applied to the device, and after 2 seconds, the dielectric constant $\in_\perp$ in a minor axis direction of the liquid crystal molecules was measured.

(7) Threshold voltage (Vth; measured at 25° C.; V): An LCD-5100 luminance meter made by Otsuka Electronics Co., Ltd. was used for measurement. A light source was a halogen lamp. A sample was put in a normally black mode VA device in which a distance (cell gap) between two glass substrates was 4 μm and a rubbing direction was antiparallel, and the device was sealed with an UV-curable adhesive. A voltage (60 Hz, rectangular waves) to be applied to the device was stepwise increased from 0 V to 20 V at an increment of 0.02 V. On the occasion, the device was irradiated with light from a direction perpendicular to the device, and an amount of light transmitted through the device was measured. A voltage-transmittance curve was prepared, in which the maximum amount of light corresponds to 100% transmittance and the minimum amount of light corresponds to 0% transmittance. A threshold voltage is expressed in terms of a voltage at 10% transmittance.

(8) Voltage holding ratio (VHR-1a; measured at 25° C.; %): A TN device used for measurement had a polyimide alignment film, and a distance (cell gap) between two glass substrates was 5 μm. A sample was put in the device, and the device was sealed with an UV-curable adhesive. A pulse voltage (60 microseconds at 5 V) was applied to the TN device and the device was charged. A decaying voltage was measured for 166.7 milliseconds with a high-speed voltmeter, and area A between a voltage curve and a horizontal axis in a unit cycle was determined. Area B is an area without decay. A voltage holding ratio is expressed in terms of a percentage of area A to area B.

(9) Voltage holding ratio (VHR-2a; measured at 60° C.; %): A voltage holding ratio was measured according to procedures identical with the procedures described above except that measurement was carried out at 60° C. in place of 25° C. The thus obtained value was expressed in terms of VHR-2a. In a composition containing a polymerizable compound, a TN device was irradiated with UV light of 25 mW/cm$^2$ for 400 seconds while applying a voltage of 15V to the TN device, and the polymerizable compound in the composition was polymerized. An EXECURE 4000-D type Mercury-Xenon lamp made from HOYA CANDEO OPTRONICS CORPORATION was used for irradiation of UV light.

(10) Voltage holding ratio (VHR-3a; measured at 60° C.; %): Stability to UV light was evaluated by measuring a voltage holding ratio after a device was irradiated with UV light. A TN device used for measurement had a polyimide alignment film and a cell gap was 5 μm. A sample was injected into the device, and then the device was irradiated with light for 167 minutes. A light source was black light (peak wavelength of 369 nm), and a distance between the device and the light source was 5 millimeters. In measurement of VHR-3a, a decaying voltage was measured for 166.7 milliseconds. A composition containing a polymerizable compound was polymerized on condition described in (9) item. A composition having large VHR-3a has a large stability to UV light.

(11) Voltage holding ratio (VHR-4a; measured at 25° C.; %): Stability to heat was evaluated by measuring a voltage holding ratio after a TN device into which a sample was injected was heated in a constant-temperature bath at 80° C. for 500 hours. In measurement of VHR-4a, a decaying voltage was measured for 166.7 milliseconds. A composition having large VHR-4a has a large stability to heat.

(12) Response time (τ; measured at 25° C.; ms): An LCD-5100 luminance meter made by Otsuka Electronics Co., Ltd. was used for measurement. A light source was a halogen lamp. A low-pass filter was set at 5 kHz.

(1) A composition containing no polymerizable compound: A sample was put in a normally black mode VA device in which a distance (cell gap) between two glass substrates was 4 μm and a rubbing direction was anti-parallel. The device was sealed with an UV-curable adhesive. A voltage (rectangular waves; 60 Hz, 10V, 0.5 second) was applied to the device. On the occasion, the device was irradiated with light from a direction perpendicular to the device, and an amount of light transmitted through the device was measured: The maximum amount of light corresponds to 100% transmittance and the minimum amount of light corresponds to 0% transmittance. A response time was expressed in terms of time required for a change from 90% transmittance to 10% transmittance (fall time; millisecond).

(2) A composition containing a polymerizable compound: A sample was put in a normally black mode PVA device in which a distance (cell gap) between two glass substrates was 3.2 μm and a rubbing direction was anti-parallel. The device was sealed with an UV-curable adhesive. The device was irradiated with UV light of 25 mW/cm² for 400 seconds while applying a voltage of 15V to the device. The EXECURE 4000-D type Mercury-Xenon lamp made from HOYA CANDEO OPTRONICS CORPORATION was used for irradiation of UV light. Rectangular waves (60 Hz, 10V, 0.5 second) were applied to the device. On the occasion, the device was irradiated with light from a direction perpendicular to the device, and an amount of light transmitted through the device was measured: The maximum amount of light corresponds to 100% transmittance and the minimum amount of light corresponds to 0% transmittance. A response time was expressed in terms of time required for a change from 0% transmittance to 90% transmittance (rise time; millisecond).

(13) Specific resistance (ρ; measured at 25 C; Ωcm): Into a vessel equipped with electrodes, 1.0 milliliter of a sample was injected. A direct current voltage (10V) was applied to the vessel, and a direct current after 10 seconds was measured: Specific resistance was calculated from the following equation: (specific resistance)={(voltage)×(electric capacity of the vessel)}/{(direct current)×(dielectric constant of vacuum)}.

The compounds described in Comparative Examples and Examples were described using symbols according to definitions in Table 3 below. In Table 3, the configuration of 1,4-cyclohexylene is trans. A parenthesized number next to a symbolized compound in Examples corresponds to the number of the compound. A symbol (–) means any other liquid crystal compound. A proportion (percentage) of the liquid crystal compound is expressed in terms of weight percent (wt %) based on the weight of the liquid crystal composition.

TABLE 3

Method for Description of Compounds using Symbols
R—(A$_1$)—Z$_1$—. . . —Z$_n$—(A$_n$)—R'

| 1) Left-terminal Group R— | Symbol |
| --- | --- |
| C$_n$H$_{2n+1}$— | n- |
| C$_n$H$_{2n+1}$O— | nO— |
| C$_m$H$_{2m+1}$OC$_n$H$_{2n}$— | mOn- |
| CH$_2$=CH— | V— |
| C$_n$H$_{2n+1}$—CH=CH— | nV— |
| CH$_2$=CH—C$_n$H$_{2n}$— | Vn- |
| C$_m$H$_{2m+1}$—CH=CH—C$_n$H$_{2n}$— | mVn- |
| CF$_2$=CH— | VFF— |
| CF$_2$=CH—C$_n$H$_{2n}$— | VFFn- |
| CH$_2$=CH—COO— | AC— |
| CH$_2$=C(CH$_3$)—COO— | MAC— |

| 2) Right-terminal Group —R' | Symbol |
| --- | --- |
| —C$_n$H$_{2n+1}$ | -n |
| —OC$_n$H$_{2n+1}$ | —On |
| —CH=CH$_2$ | —V |
| —CH=CH—C$_n$H$_{2n+1}$ | —Vn |
| —C$_n$H$_{2n}$—CH=CH$_2$ | -nV |
| —C$_m$H$_{2m}$—CH=CH—C$_n$H$_{2n+1}$ | -mVn |
| —CH=CF$_2$ | —VFF |
| —OCO—CH=CH$_2$ | —AC |
| —OCO—C(CH$_3$)=CH$_2$ | —MAC |

| 3) Bonding Group —Z$_n$— | Symbol |
| --- | --- |
| —C$_n$H$_{2n}$— | n |
| —COO— | E |
| —CH=CH— | V |
| —CH=CHO— | VO |
| —OCH=CH— | OV |
| —CH$_2$O— | 1O |
| —OCH$_2$— | O1 |

| 4) Ring Structure —A$_n$— | Symbol |
| --- | --- |
| 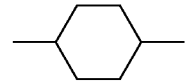 | H |
| 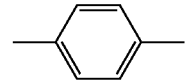 | B |
| 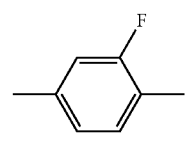 | B(F) |
| 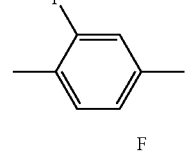 | B(2F) |
| 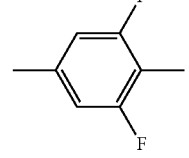 | B(F,F) |
| 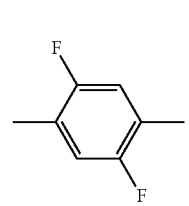 | B(2F,5F) |

TABLE 3-continued

Method for Description of Compounds using Symbols
R—(A$_1$)—Z$_1$—...—Z$_n$—(A$_n$)—R'

| | |
|---|---|
| 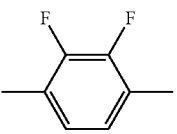 | B(2F,3F) |
| 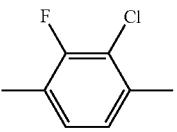 | B(2F,3CL) |
| 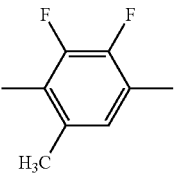 | B(2F,3F,6Me) |
| 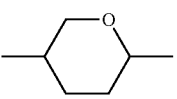 | dh |
| 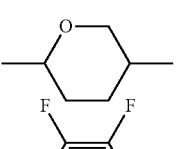 | Dh |
| 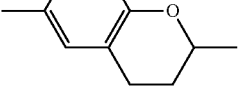 | Cro(7F,8F) |

5) Examples of Description

Example 1. 2-BB(F)B-3

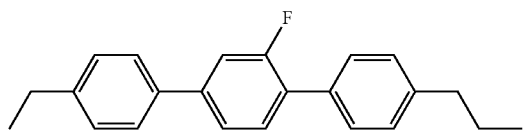

Example 2. MAC-BB-MAC

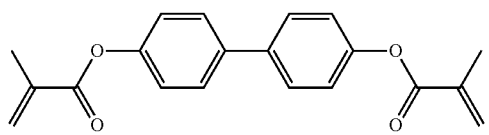

Example 3. V-HHB-1

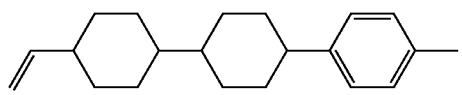

Example 4. 3-HDhB(2F,3F)-O2

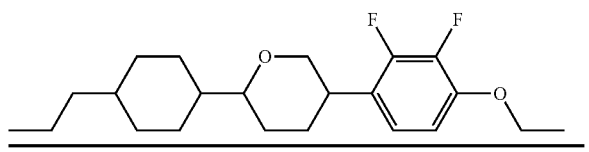

Example 1

| | | |
|---|---|---|
| 3-H1OB (2F, 3F)-O2 | (2-3) | 4% |
| V2-BB (2F, 3F)-O1 | (2-4) | 5% |
| V2-BB (2F, 3F)-O2 | (2-4) | 9% |
| 1V2-BB (2F, 3F)-O2 | (2-4) | 6% |
| V-HHB (2F, 3F)-O1 | (2-6) | 3% |
| V-HHB (2F, 3F)-O2 | (2-6) | 10% |
| 3-HH1OB (2F, 3F)-O2 | (2-8) | 11% |
| 2-BB (2F, 3F) B-3 | (2-9) | 9% |
| 3-HH-V | (3-1) | 27% |
| 3-HH-V1 | (3-1) | 9% |
| 3-HHB-O1 | (3-5) | 3% |
| V-HHB-1 | (3-5) | 4% |

A composition having negative dielectric anisotropy was prepared, and characteristics thereof were measured: NI=75.6° C.; T$_c$<−20° C.; Δn=0.111; Δ∈=−3.1; Vth=2.30 V.

To the composition, compound (1-1-1-1) was added at a proportion of 0.4 wt %.

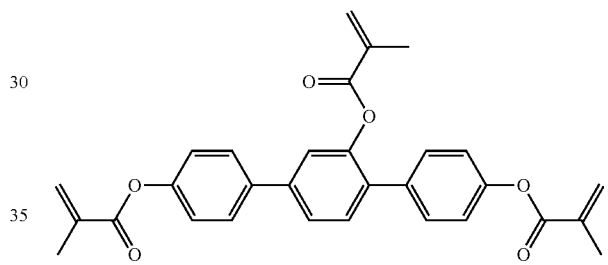

(1-1-1-1)

Photopolymerization was performed by irradiation with UV light, and then a response time was measured: t=4.0 ms.

Comparative Example 1

A response time of the composition before adding compound (1-1-1-1) in Example 1 to the composition was measured: t=5.6 ms.

A response time of the composition in Example 1 was 4.0 ms, and the response time of the composition in Comparative Example 1 was 5.6 ms. From the results, a PVA device in Example 1 was found to have a shorter response time in comparison with a PVA device in Comparative Example 1. Accordingly, the liquid crystal composition according to the invention is concluded to have superb characteristics in view of a liquid crystal display device having a polymer sustained alignment mode.

Example 2

| | | |
|---|---|---|
| 3-H1OB (2F, 3F)-O2 | (2-3) | 8% |
| V2-BB (2F, 3F)-O1 | (2-4) | 5% |
| V2-BB (2F, 3F)-O2 | (2-4) | 9% |

| | | |
|---|---|---|
| 1V2-BB (2F, 3F)-O4 | (2-4) | 6% |
| V-HHB (2F, 3F)-O2 | (2-6) | 10% |
| V-HHB (2F, 3F)-O4 | (2-6) | 3% |
| 1V2-HHB (2F, 3F)-O2 | (2-6) | 4% |
| 3-HH1OB (2F, 3F)-O2 | (2-8) | 11% |
| 3-HH-V | (3-1) | 26% |
| 1-HH-2V1 | (3-1) | 5% |
| 5-HB-O2 | (3-2) | 4% |
| 3-HHB-O1 | (3-5) | 5% |
| V-HHB-1 | (3-5) | 4% |

A composition having negative dielectric anisotropy was prepared, and characteristics thereof were measured: NI=74.0° C.; T$_c$<−20° C.; Δn=0.101; Δ∈=−3.4; Vth=2.18 V.

To the composition, compound (1-1-1-1) and compound (4-2-3) were added at a proportion of 0.3 wt % and a proportion of 0.1 wt %, respectively.

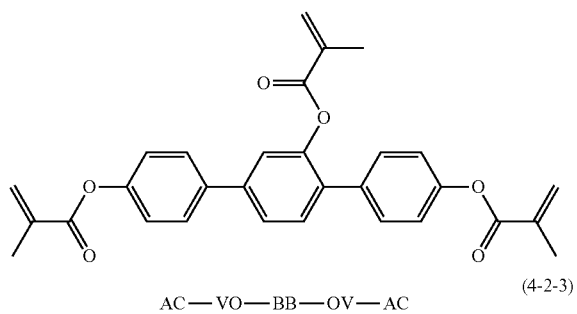

(1-1-1-1)

AC—VO—BB—OV—AC (4-2-3)

Photopolymerization was performed by irradiation with UV light, and then a response time was measured: t=4.3 ms.

Example 3

| | | |
|---|---|---|
| 3-BB (2F, 3F)-O2 | (2-4) | 9% |
| 2O-BB (2F, 3F)-O2 | (2-4) | 3% |
| 2-HH1OB (2F, 3F)-O2 | (2-8) | 10% |
| 3-HH1OB (2F, 3F)-O2 | (2-8) | 20% |
| 2-BB (2F, 3F) B-4 | (2-9) | 3% |
| 2-HH-3 | (3-1) | 19% |
| 3-HH-4 | (3-1) | 4% |
| 3-HH-V | (3-1) | 8% |
| V2-BB-1 | (3-3) | 3% |
| 1-BB-3 | (3-3) | 6% |
| V-HHB-3 | (3-5) | 5% |
| 3-HBB-2 | (3-6) | 4% |
| 5-B (F) BB-2 | (3-7) | 3% |
| 5-HBBH-3 | (3-11) | 3% |

A composition having negative dielectric anisotropy was prepared, and characteristics thereof were measured: NI=83.6° C.; T$_c$<−20° C.; Δn=0.108; Δ∈=−2.8; Vth=2.34 V.

To the composition, compound (1-1-3-1) and compound (4-18-2) were added at a proportion of 0.2 wt % and a proportion of 0.2 wt %, respectively.

(1-1-3-1)

MAC—BB(F)B—B—AC (4-18-2)

Photopolymerization was performed by irradiation with UV light, and then a response time was measured: t=3.7 ms.

Example 4

| | | |
|---|---|---|
| 3-BB (2F, 3F)-O2 | (2-4) | 10% |
| 5-BB (2F, 3F)-O4 | (2-4) | 3% |
| 2-HH1OB (2F, 3F)-O2 | (2-8) | 10% |
| 3-HH1OB (2F, 3F)-O2 | (2-8) | 22% |
| 2-HH-3 | (3-1) | 21% |
| 3-HH-V | (3-1) | 8% |
| 1-BB-3 | (3-3) | 8% |
| 1V2-BB-1 | (3-3) | 3% |
| V2-HHB-1 | (3-5) | 5% |
| 3-HBB-2 | (3-6) | 4% |
| 5-B (F) BB-3 | (3-7) | 3% |
| 1O1-HBBH-4 | (-) | 3% |

A composition having negative dielectric anisotropy was prepared, and characteristics thereof were measured: NI=78.6° C.; T$_c$<−20° C.; Δn=0.107; Δ∈=−2.6; Vth=2.39 V.

To the composition, compound (1-1-4-1) and compound (4-1-1) were added at a proportion of 0.2 wt % and a proportion of 0.2 wt %, respectively.

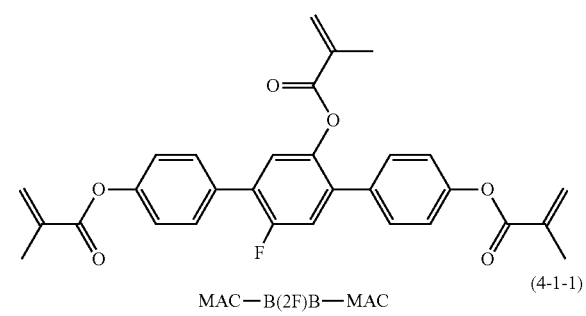

(1-1-4-1)

MAC—B(2F)B—MAC (4-1-1)

Photopolymerization was performed by irradiation with UV light, and then a response time was measured: t=3.8 ms.

Example 5

| | | |
|---|---|---|
| V2-BB (2F, 3F)-O2 | (2-4) | 12% |
| 1V2-BB (2F, 3F)-O2 | (2-4) | 6% |
| 1V2-BB (2F, 3F)-O4 | (2-4) | 3% |

| | | |
|---|---|---|
| V-HHB (2F, 3F)-O1 | (2-6) | 6% |
| V-HHB (2F, 3F)-O2 | (2-6) | 12% |
| V-HHB (2F, 3F)-O4 | (2-6) | 5% |
| 3-HDhB (2F, 3F)-O2 | (2-11) | 5% |
| 3-dhBB (2F, 3F)-O2 | (2-14) | 4% |
| 3-HH-V | (3-1) | 30% |
| 1-BB-3 | (3-3) | 6% |
| V-HHB-1 | (3-5) | 5% |
| 1-BB(F) B-2V | (3-8) | 3% |
| 3-HHEBH-4 | (3-9) | 3% |

A composition having negative dielectric anisotropy was prepared, and characteristics thereof were measured: NI=77.4° C.; $T_c$<−20° C.; Δn=0.112; Δ∈=−2.9; Vth=2.31 V.

To the composition, compound (1-1-5-1) and compound (4-18-2) were added at a proportion of 0.35 wt % and a proportion of 0.05 wt %, respectively.

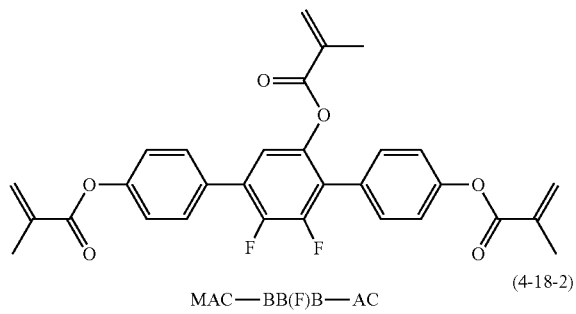

(1-1-5-1)

MAC—BB(F)B—AC   (4-18-2)

Photopolymerization was performed by irradiation with UV light, and then a response time was measured: t=4.4 ms.

Example 6

| | | |
|---|---|---|
| V2-BB (2F, 3F)-O2 | (2-4) | 12% |
| 1V2-BB (2F, 3F)-O2 | (2-4) | 6% |
| 1V2-BB (2F, 3F)-O4 | (2-4) | 3% |
| V-HHB (2F, 3F)-O1 | (2-6) | 6% |
| V-HHB (2F, 3F)-O2 | (2-6) | 7% |
| V-HHB (2F, 3F)-O4 | (2-6) | 5% |
| 1V2-HHB (2F, 3F)-O4 | (2-6) | 5% |
| 3-HDhB (2F, 3F)-O2 | (2-11) | 5% |
| 3-dhBB (2F, 3F)-O2 | (2-14) | 5% |
| 3-HH-V | (3-1) | 29% |
| V2-HB-1 | (3-2) | 6% |
| V-HHB-1 | (3-5) | 5% |
| 2-BB (F) B-5 | (3-8) | 3% |
| 5-HBB (F) B-3 | (3-13) | 3% |

A composition having negative dielectric anisotropy was prepared, and characteristics thereof were measured: NI=79.0° C.; $T_c$<−20° C.; Δn=0.112; Δ∈=−2.9; Vth=2.36 V.

To the composition, compound (1-1-6-1) and compound (4-18-1) were added at a proportion of 0.3 wt % and a proportion of 0.1 wt %, respectively.

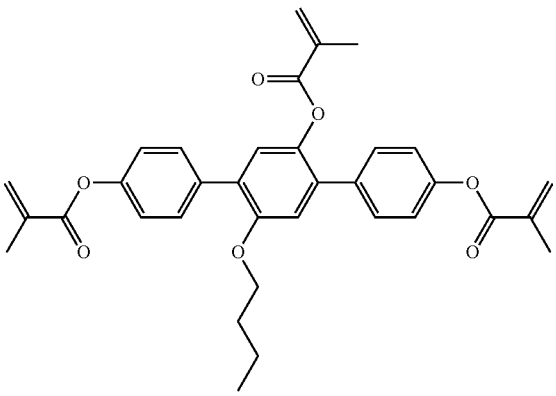

(1-1-6-1)

MAC—BB(F)B—OV—MAC   (4-18-2)

Photopolymerization was performed by irradiation with UV light, and then a response time was measured: t=4.4 ms.

Example 7

| | | |
|---|---|---|
| 3-HB (2F, 3F)-O2 | (2-1) | 3% |
| V2-BB (2F, 3F)-O2 | (2-4) | 11% |
| 1V2-BB (2F, 3F)-O2 | (2-4) | 6% |
| V2-HHB (2F, 3F)-O2 | (2-6) | 5% |
| 3-HDhB (2F, 3F)-O2 | (2-11) | 5% |
| 3-HBB (2F, 3F)-O2 | (2-13) | 3% |
| V-HBB (2F, 3F)-O2 | (2-13) | 6% |
| V2-HBB (2F, 3F)-O2 | (2-13) | 6% |
| 3-dhBB (2F, 3F)-O2 | (2-14) | 5% |
| 5-HH-O1 | (3-1) | 4% |
| 3-HH-V | (3-1) | 25% |
| 3-HH-VFF | (3-1) | 3% |
| 1-BB-3 | (3-3) | 6% |
| 3-HHEH-3 | (3-4) | 3% |
| V-HHB-1 | (3-5) | 6% |
| V2-HHB-1 | (3-5) | 3% |

A composition having negative dielectric anisotropy was prepared, and characteristics thereof were measured: NI=75.3° C.; $T_c$<−20° C.; Δn=0.113; Δ∈=−2.5; Vth=2.39 V.

To the composition, compound (1-1-1-1) and compound (4-2-4) were added at a proportion of 0.2 wt % and a proportion of 0.1 wt %, respectively.

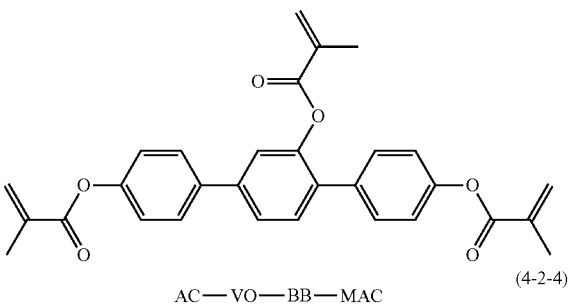

(1-1-1-1)

AC—VO—BB—MAC   (4-2-4)

Photopolymerization was performed by irradiation with UV light, and then a response time was measured: t=4.5 ms.

Example 8

| | | |
|---|---|---|
| V2-BB (2F, 3F)-O2 | (2-4) | 10% |
| 1V2-BB (2F, 3F)-O2 | (2-4) | 4% |
| 1V2-BB (2F, 3F)-O4 | (2-4) | 4% |
| V-HHB (2F, 3F)-O1 | (2-6) | 6% |
| V-HHB (2F, 3F)-O2 | (2-6) | 10% |
| V-HHB (2F, 3F)-O4 | (2-6) | 5% |
| 3-DhH1OB (2F, 3F)-O2 | (2-12) | 3% |
| 3-HHB (2F, 3CL)-O2 | (2-16) | 3% |
| 5-HBB (2F, 3CL)-O2 | (2-17) | 3% |
| 3-H1OCro (7F, 8F)-5 | (2-18) | 3% |
| 3-HH1OCro (7F, 8F)-5 | (2-19) | 3% |
| 3-HH-V | (3-1) | 29% |
| 1-BB-3 | (3-3) | 6% |
| V-HHB-1 | (3-5) | 7% |
| 3-HBB-2 | (3-6) | 4% |

A composition having negative dielectric anisotropy was prepared, and characteristics thereof were measured: NI=74.5° C.; $T_c$<−20° C.; Δn=0.105; Δ∈=−3.0; Vth=2.22 V.

To the composition, compound (1-1-1-1) and compound (4-2-3) were added at a proportion of 0.25 wt % and a proportion of 0.05 wt %, respectively.

(1-1-1-1)

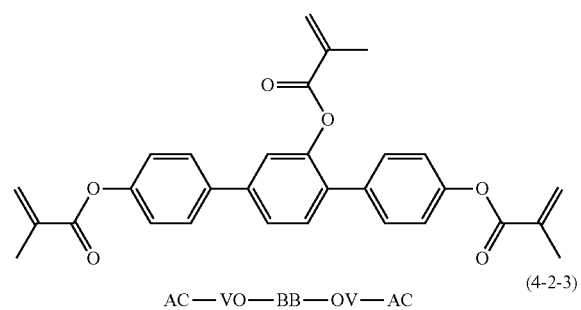

(4-2-3)

AC—VO—BB—OV—AC

Photopolymerization was performed by irradiation with UV light, and then a response time was measured: t=4.8 ms.

Example 9

| | | |
|---|---|---|
| V2-HB (2F, 3F)-O2 | (2-1) | 5% |
| 3-H2B (2F, 3F)-O2 | (2-2) | 9% |
| V-HHB (2F, 3F)-O2 | (2-6) | 12% |
| 2-HH1OB (2F, 3F)-O2 | (2-8) | 7% |
| 3-HH1OB (2F, 3F)-O2 | (2-8) | 12% |
| 3-HDhB (2F, 3F)-O2 | (2-11) | 3% |
| 2-HH-3 | (3-1) | 27% |
| 3-HH-4 | (3-1) | 4% |
| 1-BB-3 | (3-3) | 9% |
| 3-HHB-1 | (3-5) | 3% |
| 3-B (F) BB-2 | (3-7) | 3% |
| 3-HB (F) HH-5 | (3-10) | 3% |
| 3-HB (F) BH-3 | (3-12) | 3% |

A composition having negative dielectric anisotropy was prepared, and characteristics thereof were measured: NI=79.9° C.; $T_c$<−20° C.; Δn=0.092; Δ∈=−2.9; Vth=2.32 V.

To the composition, compound (1-1-3-1) and compound (1-1-6-1) were added at a proportion of 0.2 wt % and a proportion of 0.1 wt %, respectively.

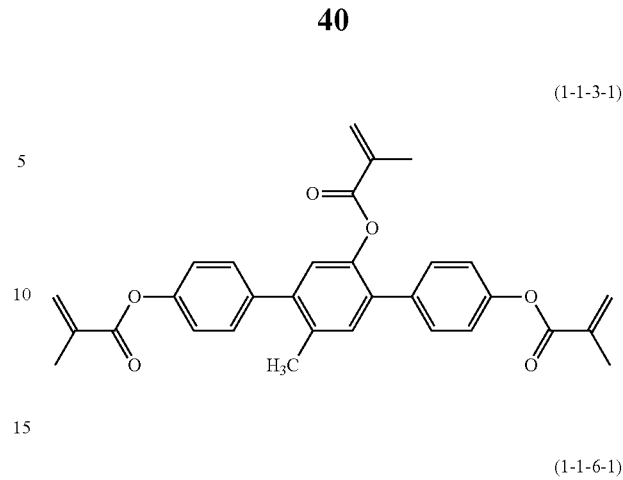

Photopolymerization was performed by irradiation with UV light, and then a response time was measured: t=3.9 ms.

Example 10

| | | |
|---|---|---|
| 1V2-HB (2F, 3F)-O2 | (2-1) | 5% |
| 5-H2B (2F, 3F)-O2 | (2-2) | 9% |
| 5-HHB (2F, 3F)-O2 | (2-6) | 3% |
| V-HHB (2F, 3F)-O2 | (2-6) | 6% |
| 2-HH1OB (2F, 3F)-O2 | (2-8) | 7% |
| 3-HH1OB (2F, 3F)-O2 | (2-8) | 12% |
| 2-BB (2F, 3F) B-3 | (2-9) | 3% |
| 2-HHB (2F, 3CL)-O2 | (2-16) | 3% |
| 4-HHB (2F, 3CL)-O2 | (2-16) | 3% |
| 2-HH-3 | (3-1) | 22% |
| 3-HH-V | (3-1) | 8% |
| 1-BB-3 | (3-3) | 10% |
| 3-HHB-1 | (3-5) | 3% |
| 3-HB (F) HH-5 | (3-10) | 3% |
| 3-HB (F) BH-3 | (3-12) | 3% |

A composition having negative dielectric anisotropy was prepared, and characteristics thereof were measured: NI=80.5° C.; $T_c$<−20° C.; Δn=0.093; Δ∈=−2.9; Vth=2.32 V.

To the composition, compound (1-1-1-1) and compound (1-1-3-1) were added at a proportion of 0.1 wt % and a proportion of 0.3 wt %, respectively.

(1-1-1-1)

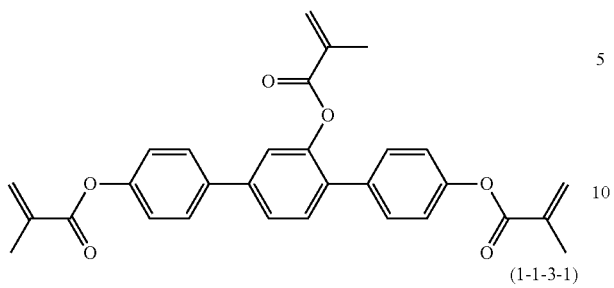

(1-1-3-1)

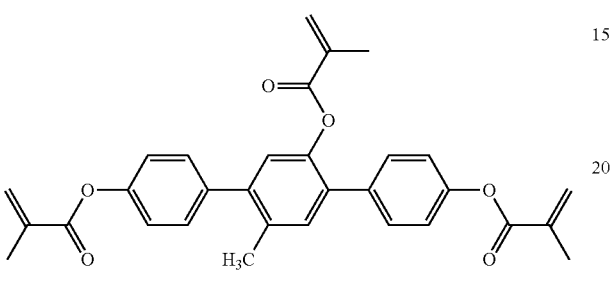

Photopolymerization was performed by irradiation with UV light, and then a response time was measured: t=4.2 ms.

Example 11

| | | |
|---|---|---|
| 3-HB (2F, 3F)-O4 | (2-1) | 5% |
| V-HB (2F, 3F)-O2 | (2-1) | 4% |
| V2-BB (2F, 3F)-O2 | (2-4) | 7% |
| 1V2-BB (2F, 3F)-O2 | (2-4) | 6% |
| 2O-B (2F, 3F) B (2F, 3F)-O6 | (2-5) | 3% |
| V-HHB (2F, 3F)-O2 | (2-6) | 10% |
| 3-HH2B (2F, 3F)-O2 | (2-7) | 3% |
| 3-HH1OB (2F, 3F)-O2 | (2-8) | 10% |
| 2-BB (2F, 3F) B-3 | (2-9) | 6% |
| 3-HH-V | (3-1) | 27% |
| 4-HH-V1 | (3-1) | 6% |
| 3-HH-2V1 | (3-1) | 3% |
| 3-HBB-2 | (3-6) | 7% |
| 5-HBB (F) B-2 | (3-13) | 3% |

A composition having negative dielectric anisotropy was prepared, and characteristics thereof were measured: NI=79.2° C.; T$_c$<−20° C.; Δn=0.112; Δ∈=−3.1; Vth=2.29 V.

To the composition, compound (1-1-1-1) was added at a proportion of 0.4 wt %.

(1-1-1-1)

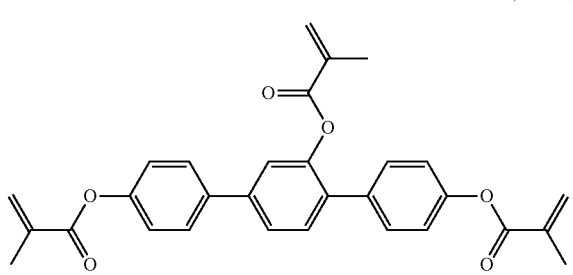

Photopolymerization was performed by irradiation with UV light, and then a response time was measured: t=4.3 ms.

Example 12

| | | |
|---|---|---|
| 3-HB (2F, 3F)-O2 | (2-1) | 5% |
| V-HB (2F, 3F)-O4 | (2-1) | 4% |
| 5-BB (2F, 3F)-O2 | (2-4) | 6% |
| V2-BB (2F, 3F)-O2 | (2-4) | 7% |
| 3-B (2F, 3F) B (2F, 3F)-O2 | (2-5) | 3% |
| V-HHB (2F, 3F)-O2 | (2-6) | 10% |
| 3-HH1OB (2F, 3F)-O2 | (2-8) | 10% |
| 2-BB (2F, 3F) B-3 | (2-9) | 5% |
| 4-HBB (2F, 3F)-O2 | (2-13) | 3% |
| 3-HBB (2F, 3CL)-O2 | (2-17) | 3% |
| 3-HH-O1 | (3-1) | 3% |
| 3-HH-V | (3-1) | 24% |
| 3-HB-O2 | (3-2) | 3% |
| V-HHB-1 | (3-5) | 7% |
| 3-BB (F) B-5 | (3-8) | 3% |
| 5-HBB (F) B-2 | (3-13) | 4% |

A composition having negative dielectric anisotropy was prepared, and characteristics thereof were measured: NI=77.7° C.; T$_c$<−20° C.; Δn=0.117; Δ∈=−3.1; Vth=2.30 V.

To the composition, compound (1-1-1-1) was added at a proportion of 0.35 wt %.

(1-1-1-1)

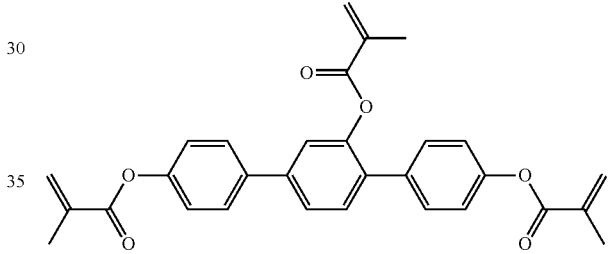

Photopolymerization was performed by irradiation with UV light, and then a response time was measured: t=4.8 ms.

Example 13

| | | |
|---|---|---|
| 3-BB (2F, 3F)-O4 | (2-4) | 5% |
| V2-BB (2F, 3F)-O2 | (2-4) | 12% |
| 1V2-BB (2F, 3F)-O1 | (2-4) | 4% |
| 3-HHB (2F, 3F)-O2 | (2-6) | 5% |
| V-HHB (2F, 3F)-O1 | (2-6) | 6% |
| V-HHB (2F, 3F)-O2 | (2-6) | 12% |
| 3-DhHB (2F, 3F)-O2 | (2-10) | 5% |
| 3-HEB (2F, 3F) B (2F, 3F)-O2 | (2-15) | 5% |
| 3-HH-V | (3-1) | 23% |
| 4-HH-V | (3-1) | 3% |
| 5-HH-V | (3-1) | 6% |
| 7-HB-1 | (3-2) | 3% |
| V-HHB-1 | (3-5) | 5% |
| 3-HBB-2 | (3-6) | 3% |
| 2-BB (F) B-3 | (3-8) | 3% |

A composition having negative dielectric anisotropy was prepared, and characteristics thereof were measured: NI=76.3° C.; T$_c$<−20° C.; Δn=0.104; Δ∈=−3.0; Vth=2.21 V.

To the composition, compound (1-1-6-1) and compound (4-18-1) were added at a proportion of 0.1 wt % and a proportion of 0.2 wt %, respectively.

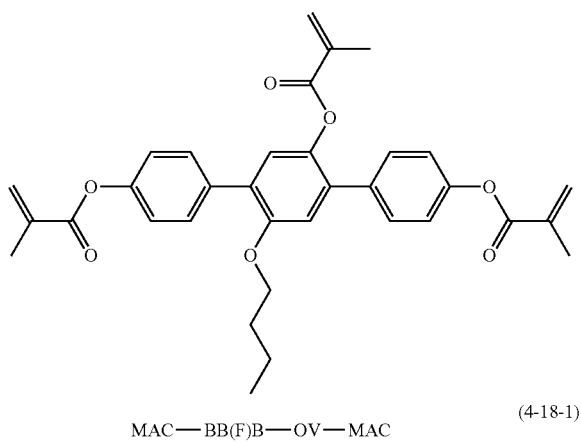

MAC—BB(F)B—OV—MAC  (4-18-1)

Photopolymerization was performed by irradiation with UV light, and then a response time was measured: t=4.6 ms.

The compositions in Example 1 to Example 13 were found to have a shorter response time in comparison with the composition in Comparative Example 1. Accordingly, the liquid crystal composition according to the invention is concluded to have superb characteristics.

INDUSTRIAL APPLICABILITY

A liquid crystal composition of the invention satisfies at least one of characteristics such as a high maximum temperature, a low minimum temperature, a small viscosity, a suitable optical anisotropy, a large negative dielectric anisotropy, a large specific resistance, a high stability to UV light, a high stability to heat or the like, or has a suitable balance regarding at least two of the characteristics. A liquid crystal display device including the composition has characteristics such as a short response time, a large voltage holding ratio, a low threshold voltage, a large contrast ratio, a long service life and so forth, and thus can be used for a liquid crystal projector, a liquid crystal television and so forth.

The invention claimed is:

1. A liquid crystal composition that has a negative dielectric anisotropy and contains at least one polymerizable compound selected from compounds represented by formula (1) and at least one compound selected from compounds represented by formula (2) as a first component:

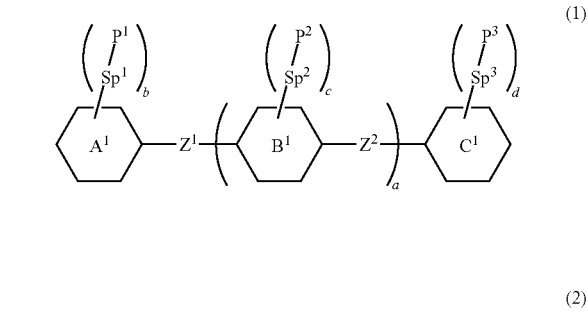

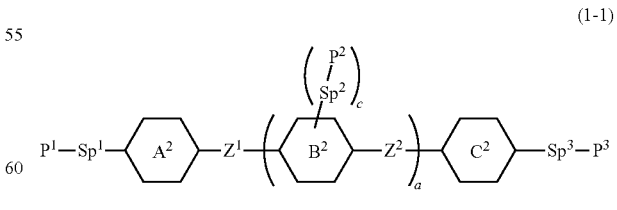

wherein, in formula (1), ring $A^1$ and ring $C^1$ are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen; ring $B^1$ is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen; $Z^1$ and $Z^2$ are independently a single bond or alkylene having 1 to 10 carbons, and in the alkylene, at least one —$CH_2$— may be replaced by —O—, —CO—, —COO— or —OCO—, at least one —$CH_2$—$CH_2$— may be replaced by —CR=CH—, —C($CH_3$)=CH—, —CH=C($CH_3$)— or —C($CH_3$)=C($CH_3$)—, and in the groups, at least one hydrogen may be replaced by fluorine or chlorine; $P^1$, $P^2$ and $P^3$ are independently acryloyloxy or methacryloyloxy; $Sp^1$, $Sp^2$ and $Sp^3$ are independently a single bond or alkylene having 1 to 10 carbons, and in the alkylene, at least one —$CH_2$— may be replaced by —O—, —COO—, —OCO— or —OCOO—, at least one —$CH_2$—$CH_2$— may be replaced by —CH=CH—or —C≡C—, and in the groups, at least one hydrogen may be replaced by fluorine or chlorine; a is 1 or 2; and b, c and d are independently an integer from 1 to 4, in which, when a is 2, one of c may be 0;

in formula (2), $R^1$ and $R^2$ are independently alkyl having 1 to 12 carbons, alkoxy having 1 to 12 carbons, alkenyl having 2 to 12 carbons or alkenyloxy having 2 to 12 carbons; ring D and ring F are independently 1,4-cyclohexylene, 1,4-phenylene, 1,4-phenylene in which at least one hydrogen is replaced by fluorine or chlorine, or tetrahydropyran-2,5-diyl; ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, —$CH_2CH_2$—, —$CH_2O$—, —$OCH_2$—, —COO— or —OCO—; and j is 1, 2 or 3, k is 0 or 1, and a sum of j and k is 3 or less.

2. The liquid crystal composition of claim 1, wherein the polymerizable compound is at least one compound selected from compounds represented by formula (1-1):

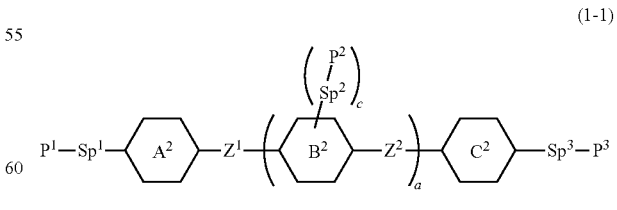

wherein, in formula (1-1), ring $A^2$, ring $B^2$ and ring $C^2$ are independently 1,4-cyclohexylene, 1,4-cyclohexenylene, 1,4-phenylene, naphthalene-1,2-diyl, naphthalene-1,4-diyl, naphthalene-1,5-diyl, naphthalene-1,7-diyl, naphthalene-1,8-diyl, naphthalene-2,3-diyl or naphthalene-2,6-diyl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen; $Z^1$ and $Z^2$ are independently a single bond, —COO—, —CH═CH—, —CH═CH—COO—, —C(CH$_3$)═CH—COO—, —CH═C(CH$_3$)—COO—, —C(CH$_3$)═C(CH$_3$)—COO—, —COCH═CH—, —C(CH$_3$)═C(CH$_3$)—, —CH═CH—CH$_2$O—, —CH═CH—OCH$_2$— or —CO—; $P^1$, $P^2$ and $P^3$ are independently acryloyloxy or methacryloyloxy; $Sp^1$, $Sp^2$ and $Sp^a$ are independently a single bond or alkylene having 1 to 10 carbons, and in the alkylene, at least one —CH$_2$— may be replaced by —O—, —COO—, —OCO— or —OCOO—, at least one —CH$_2$—CH$_2$— may be replaced by —CH═CH— or —C≡C—, and in the groups, at least one hydrogen may be replaced by fluorine or chlorine; a is 1 or 2; and c is an integer from 1 to 4, in which, when a is 2, one of c may be 0.

3. The liquid crystal composition of claim 2, wherein the polymerizable compound is at least one compound selected from the group of compounds represented by formulas (1-1-1) to (1-1-6):

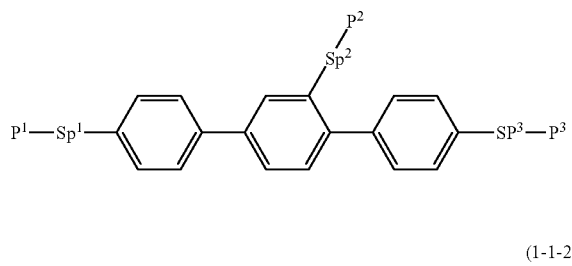

(1-1-1)

(1-1-2)

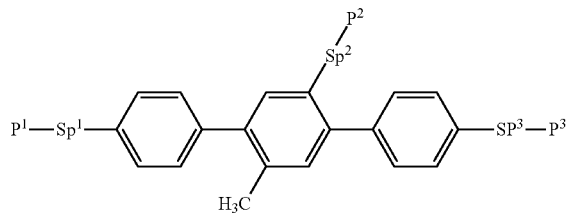

(1-1-3)

(1-1-4)

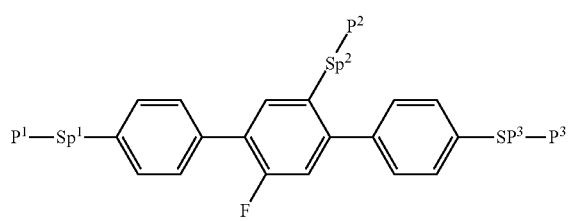

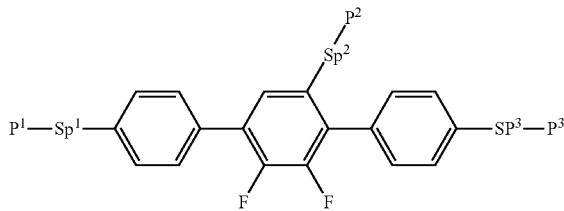

(1-1-5)

(1-1-6)

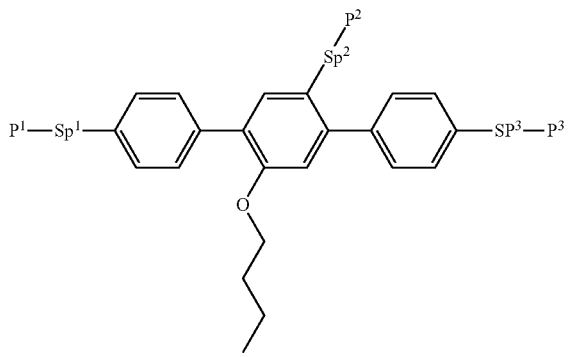

wherein, in formulas (1-1-1) to (1-1-6), $P^1$, $P^2$ and $P^3$ are independently acryloyloxy or methacryloyloxy; and $Sp^1$, $Sp^2$ and $Sp^3$ are independently a single bond or alkylene having 1 to 10 carbons, and in the alkylene, at least one —CH$_2$— may be replaced by —O—, —COO—, —OCO— or —OCOO—, at least one —CH$_2$—CH$_2$— may be replaced by —CH═CH— or —C≡C—, and in the groups, at least one hydrogen may be replaced by fluorine or chlorine.

4. The liquid crystal composition of claim 1, wherein $P^1$, $P^2$ and $P^3$ are methacryloyloxy, and $Sp^1$, $Sp^2$ and $Sp^3$ are a single bond.

5. The liquid crystal composition of claim 1, containing at least one compound selected from the group of compounds represented by formulas (2-1) to (2-19) as the first component:

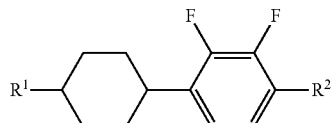

(2-1)

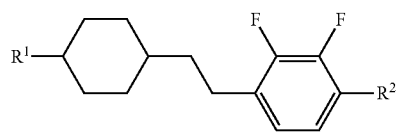

(2-2)

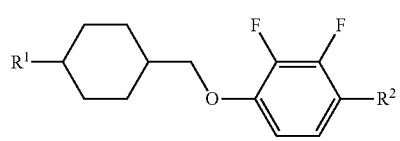

(2-3)

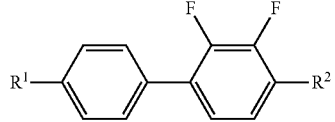

(2-4)

-continued

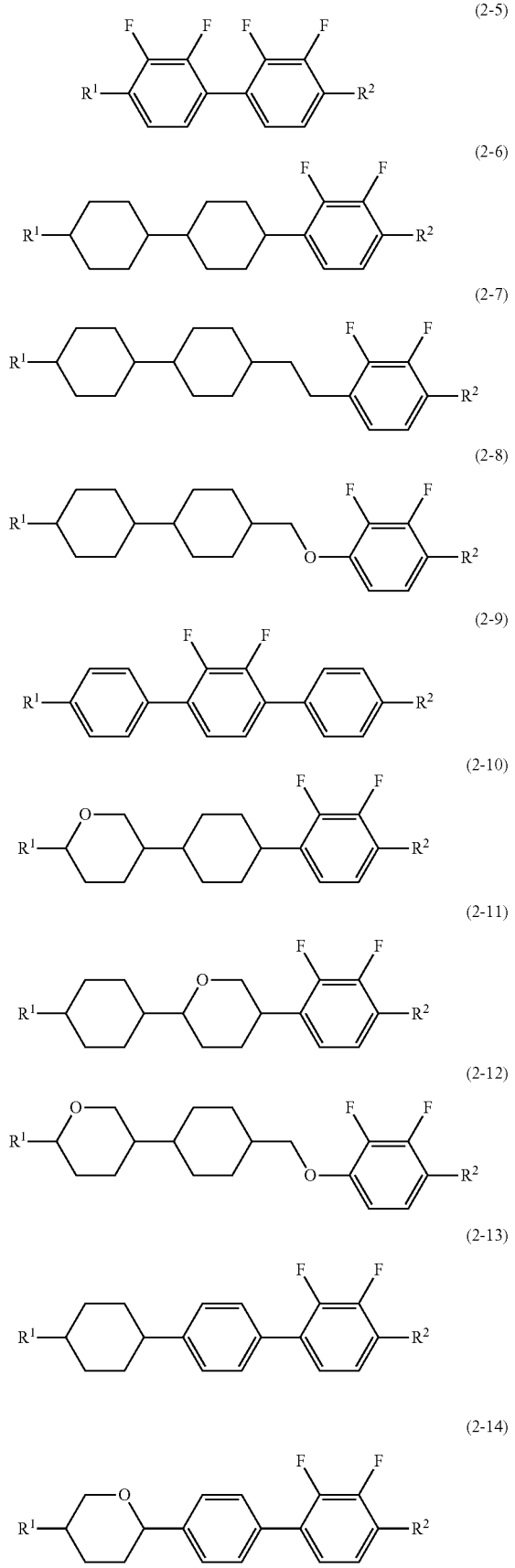

(2-5)
(2-6)
(2-7)
(2-8)
(2-9)
(2-10)
(2-11)
(2-12)
(2-13)
(2-14)

-continued

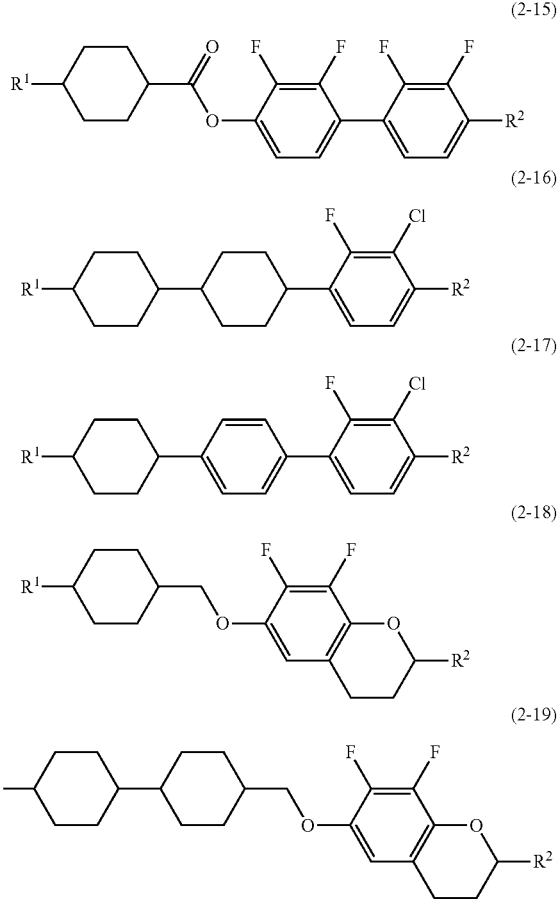

(2-15)
(2-16)
(2-17)
(2-18)
(2-19)

wherein, in formulas (2-1) to (2-19), $R^1$ and $R^2$ are independently alkyl having 1 to 12 carbons, alkoxy having 1 to 12 carbons, alkenyl having 2 to 12 carbons or alkenyloxy having 2 to 12 carbons.

6. The liquid crystal composition of claim 1, wherein a proportion of the first component is in a range of 10 wt % to 90 wt % based on a weight of the liquid crystal composition.

7. The liquid crystal composition of claim 1, further containing at least one compound selected from compounds represented by formula (3) as a second component:

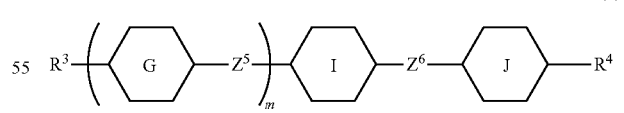

(3)

wherein, in formula (3), $R^3$ and $R^4$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine; ring G, ring I and ring J are independently 1,4-cyclohexylene, 1,4-phenylene or 2-fluoro-1,4-phenylene; $Z^5$ and $Z^6$ are independently a single bond, —CH$_2$CH$_2$—, —CH$_2$O—, —OCH$_2$—, —COO— or —OCO—; and m is 0, 1 or 2.

8. The liquid crystal composition of claim 7, containing at least one compound selected from the group of compounds represented by formulas (3-1) to (3-13) as the second component:

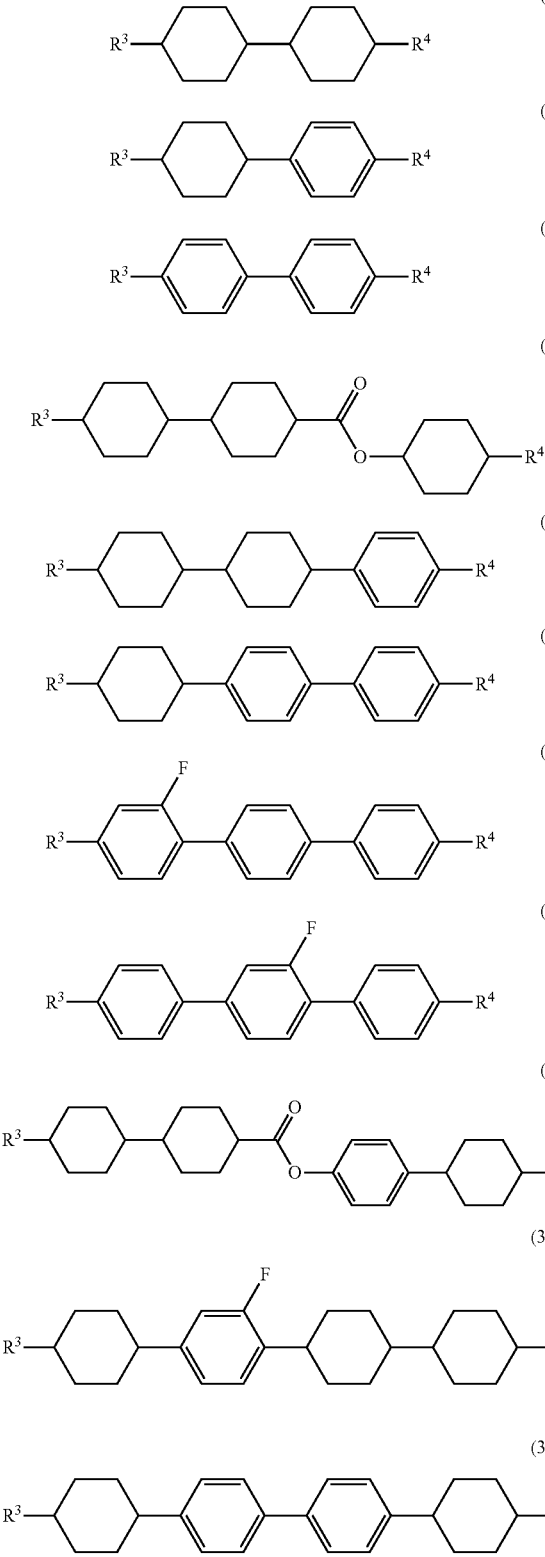

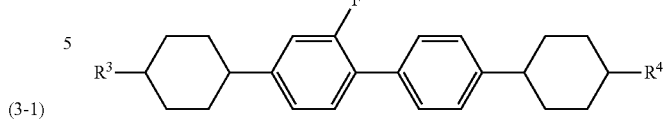

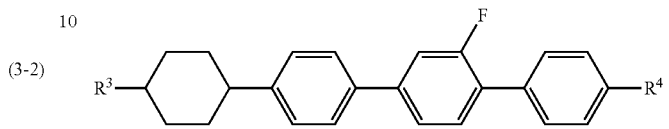

wherein, in formulas (3-1) to (3-13), $R^3$ and $R^4$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine.

9. The liquid crystal composition of claim 7, wherein a proportion of the second component is in a range of 10 wt % to 90 wt % based on a weight of the liquid crystal composition.

10. The liquid crystal composition of claim 1, further containing at least one polymerizable compound selected from compounds represented by formula (4):

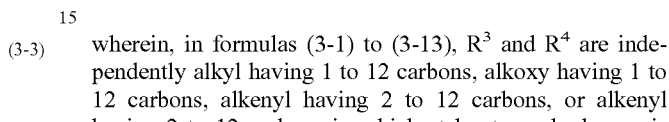

wherein, in formula (4), $P^4$ and $P^5$ are independently a polymerizable group selected from the group represented by formula (P-4) and formula (P-5);

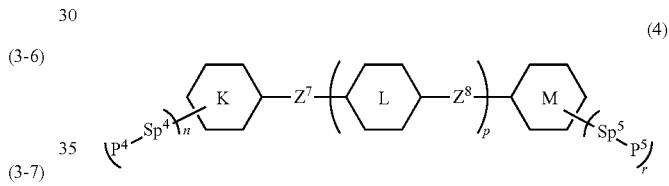

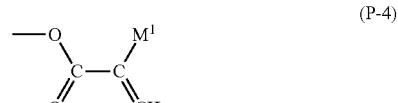

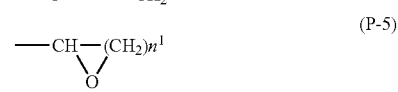

wherein, in formula (P-4), $M^1$ is hydrogen, fluorine, methyl or trifluoromethyl;
in formula (P-5), is 1, 2, 3 or 4; and
in formula (4), $Sp^4$ and $Sp^5$ are independently a single bond or alkylene having 1 to 12 carbons, in the alkylene, at least one —CH$_2$— may be replace by —O—, —S—, —NH—, —CO—, —COO—, —OCO— or —OCOO—, at least one —CH$_2$—CH$_2$— may be replaced by —CH=CH— or —C≡C—, and in the groups, at least one hydrogen may be replaced by halogen or —C≡N; $Z^7$ is a single bond, —CH$_2$CH$_2$—, —CH$_2$O—, —OCH$_2$—, —COO—, —OCO—, —CO—CR$^5$=CR$^6$—, —CR$^6$=CR$^5$—CO—, —OCO—CR$^5$=CR$^6$—, —CR$^6$=CR$^5$—COO—, —CR⁵=CR⁶— or —C(=CR⁵R⁶)—, in which R⁵ and R⁶ are independently hydrogen, halogen, alkyl having 1 to 10 carbons, or alkyl having 1 to 10 carbons in which at least one hydrogen is replaced by fluorine; Z⁸ is a single bond, —CH₂CH₂—, —CH₂O—, —OCH₂—, —COO— or —OCO—; ring K and ring M are independently cyclohexyl, phenyl, 2-fluorophenyl, 3-fluorophenyl, 2,3-difluorophenyl, 2-methylphenyl, 3-methylphenyl, 2-(trifluoromethyl)phenyl, 3-(trifluoromethyl)phenyl or 2-naphthyl; ring L is 1,4-cyclohexylene, 1,4-phenylene, naphthalene-2,6-diyl, 2-fluoro-1,4-phenylene, 2,3-difluoro-1,4-phenylene, 2,5-difluoro-1,4-phenylene, 2-methyl-1,4-phenylene or 2-trifluoromethyl-1,4-phenylene; p is 0, 1 or 2; and n and r are independently 1, 2 or 3, and a sum of n and r is 4 or less.

11. The liquid crystal composition of claim 10, containing at least one polymerizable compound selected from the group of compounds represented by formulas (4-1) to (4-26):

(4-1)

(4-2)

(4-3)

(4-4)

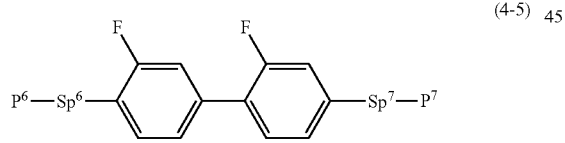
(4-5)

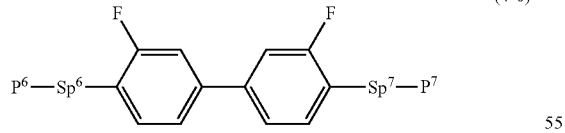
(4-6)

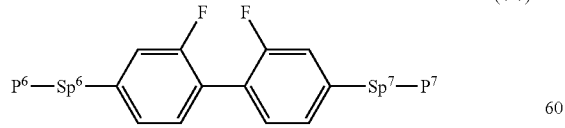
(4-7)

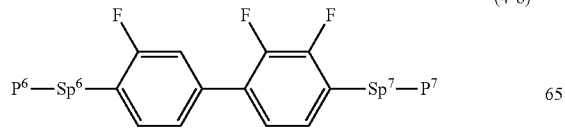
(4-8)

-continued

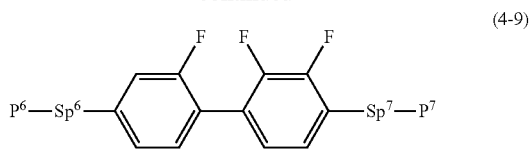
(4-9)

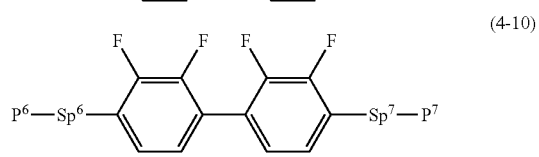
(4-10)

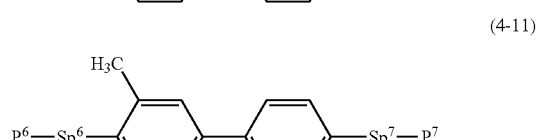
(4-11)

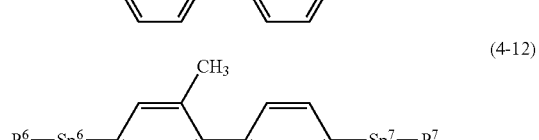
(4-12)

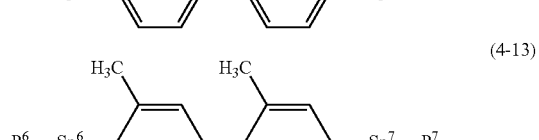
(4-13)

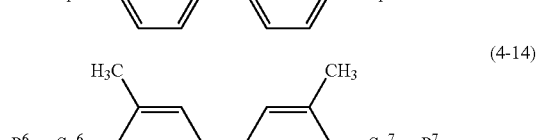
(4-14)

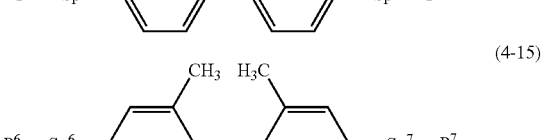
(4-15)

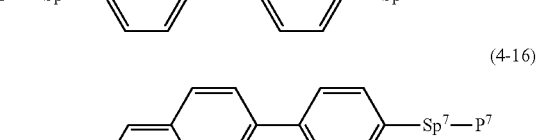
(4-16)

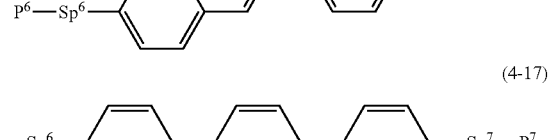
(4-17)

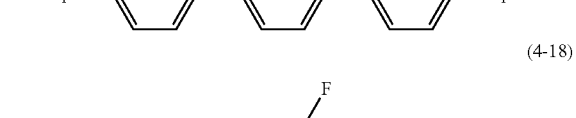
(4-18)

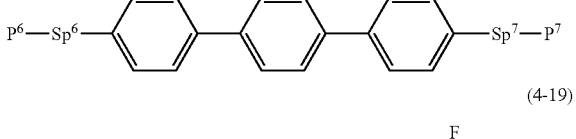
(4-19)

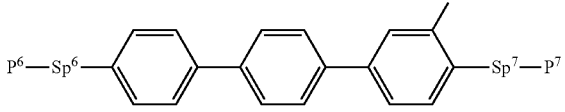

(4-20)

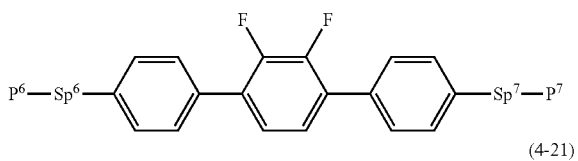

(4-21)

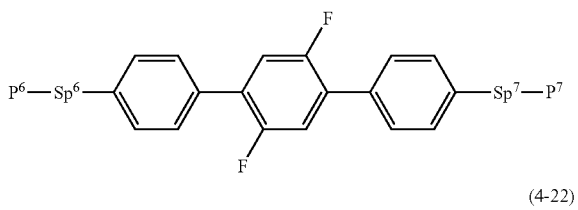

(4-22)

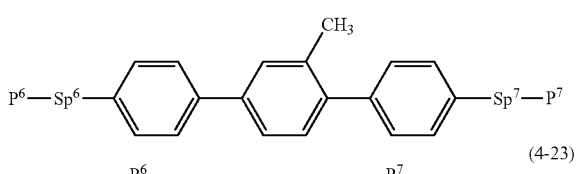

(4-23)

(4-24)

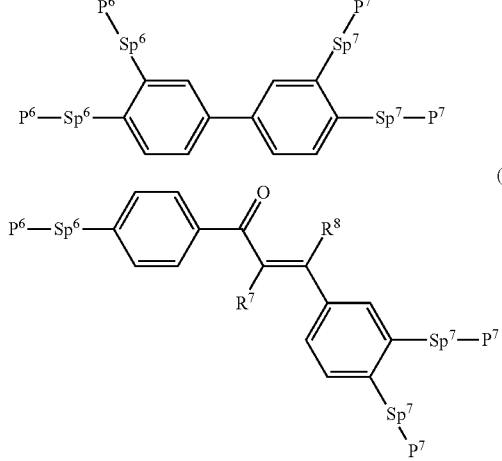

(4-25)

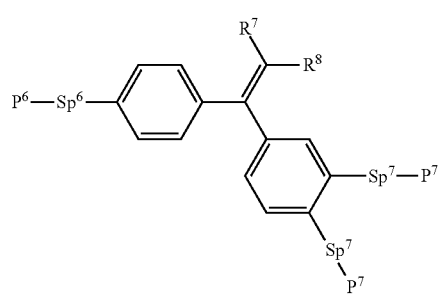

(4-26)

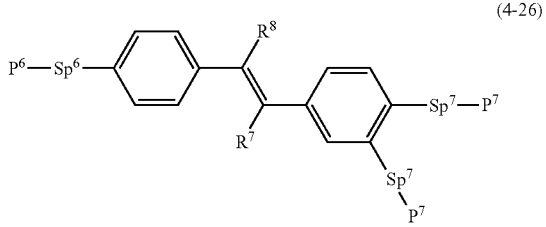

wherein, in formulas (4-1) to (4-26), $P^6$ and $P^7$ are independently polymerizable group represented by formula (P-4);

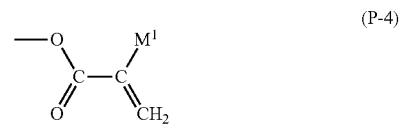

(P-4)

wherein, in formula (P-4), $M^1$ is hydrogen, fluorine, methyl or trifluoromethyl; and in formulas (4-1) to (4-26), $Sp^6$ and $Sp^7$ are independently a single bond or alkylene having 1 to 12 carbons, and in the alkylene, at least one —$CH_2$— may be replaced by —O—, —COO—, —OCO— or —OCOO—, at least one —$CH_2$—$CH_2$— may be replaced by —CH=CH— or and in the groups, at least one hydrogen may be replaced by fluorine or chlorine;

and $R^7$ and $R^8$ are independently hydrogen, fluorine, chlorine, alkyl having 1 to 3 carbons, or alkyl having 1 to 3 carbons in which at least one hydrogen is replaced by fluorine.

12. The liquid crystal composition of claim 1, wherein a proportion of the at least one polymerizable compound selected from compounds represented by formula (1) is in a range of 0.03 wt % to 10 wt % based on a weight of the liquid crystal composition.

13. The liquid crystal composition of claim 10, wherein a proportion of the at least one polymerizable compound selected from compounds represented by formula (1) and the at least one polymerizable compound selected from compounds represented by formula (4) is in a range of 0.03 wt % to 10 wt % based on a weight of the liquid crystal composition.

14. A liquid crystal display device, including the liquid crystal composition of claim 1.

15. The liquid crystal display device of claim 14, wherein an operating mode in the liquid crystal display device includes an IPS mode, a VA mode, an FFS mode or an FPA mode, and a driving mode in the liquid crystal display device includes an active matrix mode.

16. The liquid crystal display device having a polymer sustained alignment mode, wherein the liquid crystal display device includes the liquid crystal composition of claim 1, and the at least one polymerizable compound selected from compounds represented by formula (1) in the composition is polymerized.

17. The liquid crystal composition of claim 7, further containing at least one polymerizable compound selected from compounds represented by formula (4):

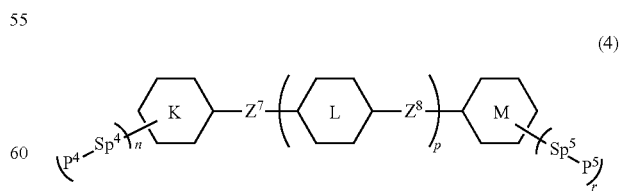

(4)

wherein, in formula (4), $P^4$ and $P^5$ are independently a polymerizable group selected from the group represented by formula (P-4) and formula (P-5);

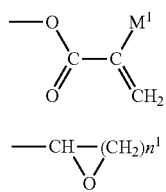 (P-4)

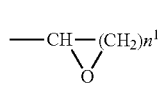 (P-5)

wherein, in formula (P-4), $M^1$ is hydrogen, fluorine, methyl or trifluoromethyl;

in formula (P-5), $n^1$ is 1, 2, 3 or 4; and in formula (4), $Sp^4$ and $Sp^5$ are independently a single bond or alkylene having 1 to 12 carbons, in the alkylene, at least one —$CH_2$— may be replace by —O—, —S—, —NH—, —CO—, —COO—, —OCO— or —OCOO—, at least one —$CH_2$—$CH_2$— may be replaced by —CH=CH— or —C≡C—, and in the groups, at least one hydrogen may be replaced by halogen or —C≡N; $Z^7$ is a single bond, —$CH_2CH_2$—, —$CH_2O$—, —$OCH_2$—, —COO—, —OCO—, —CO—$CR^5$=$CR^6$—, —$CR^6$=$CR^5$—CO—, —OCO—$CR^5$=$CR^6$—, —$CR^6$=$CR^5$—COO—, —$CR^5$=$CR^6$— or —C(=$CR^5R^6$)—, in which $R^5$ and $R^6$ are independently hydrogen, halogen, alkyl having 1 to 10 carbons, or alkyl having 1 to 10 carbons in which at least one hydrogen is replaced by fluorine; $Z^8$ is a single bond, —$CH_2CH_2$—, —$CH_2O$—, —$OCH_2$—, —COO— or —OCO—; ring K and ring M are independently cyclohexyl, phenyl, 2-fluorophenyl, 3-fluorophenyl, 2,3-difluorophenyl, 2-methylphenyl, 3-methylphenyl, 2-(trifluoromethyl)phenyl, 3-(trifluoromethyl)phenyl or 2-naphthyl; ring L is 1,4-cyclohexylene, 1,4-phenylene, naphthalene-2,6-diyl, 2-fluoro-1,4-phenylene, 2,3-difluoro-1,4-phenylene, 2,5-difluoro-1,4-phenylene, 2-methyl-1,4-phenylene or 2-trifluoromethyl-1,4-phenylene; p is 0, 1 or 2; and n and r are independently 1, 2 or 3, and a sum of n and r is 4 or less.

* * * * *